United States Patent [19]
Sato et al.

[11] Patent Number: 5,793,826
[45] Date of Patent: Aug. 11, 1998

[54] CONTROL ROD DRIVE MECHANISM

[75] Inventors: Yoshifumi Sato; Nobuyuki Tanaka; Yukio Watanabe, all of Yokohama, Japan

[73] Assignee: Kabushiki Kaisha Toshiba, Kawasaki, Japan

[21] Appl. No.: 722,765

[22] Filed: Sep. 27, 1996

[30] Foreign Application Priority Data

Sep. 29, 1995 [JP] Japan .................................. 7-253291
Jun. 26, 1996 [JP] Japan .................................. 8-165510

[51] Int. Cl.$^6$ .................................................. G21C 7/12
[52] U.S. Cl. ........................................ 376/228; 376/245
[58] Field of Search ................................ 376/228, 245, 376/258

[56] References Cited

U.S. PATENT DOCUMENTS

| | | | |
|---|---|---|---|
| 3,980,950 | 9/1976 | Kutsevalov et al. | 376/228 |
| 4,933,800 | 6/1990 | Yang | 361/29 |
| 5,089,211 | 2/1992 | Dillmann | 376/228 |

FOREIGN PATENT DOCUMENTS

| | | |
|---|---|---|
| 36 05 899 | 8/1987 | Germany . |
| 7-032557 | 3/1996 | Japan . |
| WO 90/06517 | 6/1990 | WIPO . |

OTHER PUBLICATIONS

Patent Abstracts of Japan Vol. 095, No. 009, 31 Oct. 1995 & JP 07 159577 A (Toshiba Corp) 23 Jun. 1995.
Patent Abstract of Japan Vol. 008, No. 139 (E–253, 28 Jun. 1984 & JP 047945 A (Shinano Denki Kk), 17 Mar. 1984.
Patent Abstracts of Japan Vol. 96, No. 7, 31 Jul. 1996 & JP–A–08 082690 (Toshiba Corp).
Patent Abstract of Japan Vol. 010, No. 236 (E–428), 15 Aug. 1986 & JP–A–61 069365 (Hitachi Ltd), 9 Apr. 1986.
Patent Abstracts of Japan Vol. 010, No. 248 (E–431), 26 Aug. 1986 & JP–A–61 076061 (Daido Steel Co Ltd), 18 Apr. 1986.

*Primary Examiner*—Daniel D. Wasil
*Attorney, Agent, or Firm*—Foley & Lardner

[57] ABSTRACT

A control rod mechanism for transmitting the rotation of an electric motor via a drive shaft to an elevator apparatus for raising and lowering a hollow piston on an upper end thereof, which is provided a control rod that controls the output of a nuclear reactor. The control rod mechanism is used to insert the control rod into a reactor core or remove it therefrom, and also to rapidly insert the control rod into the reactor core by the injection of hot water to force the hollow piston upward. The control rod mechanism includes a magnetic coupling having an inner magnet, which is divided into a plurality of parts and is disposed at a lower portion of the drive shaft in order to transmit the rotational power of the electric motor to the drive shaft. The control rod mechanism also includes a drive-side outer magnet, which is divided into a plurality of parts and is provided on a rotary shaft of the electric motor in an arrangement on an outer side of the inner magnet. The control rod mechanism further includes a circular cylindrical outer yoke on an inner surface of which the outer magnet is mounted on. The radial-direction position of an outer magnet installation surface on the outer yoke is the same as or further inward with respect to the radial-direction position of an inner surface of the outer yoke that is above the outer magnet installation surface.

27 Claims, 30 Drawing Sheets

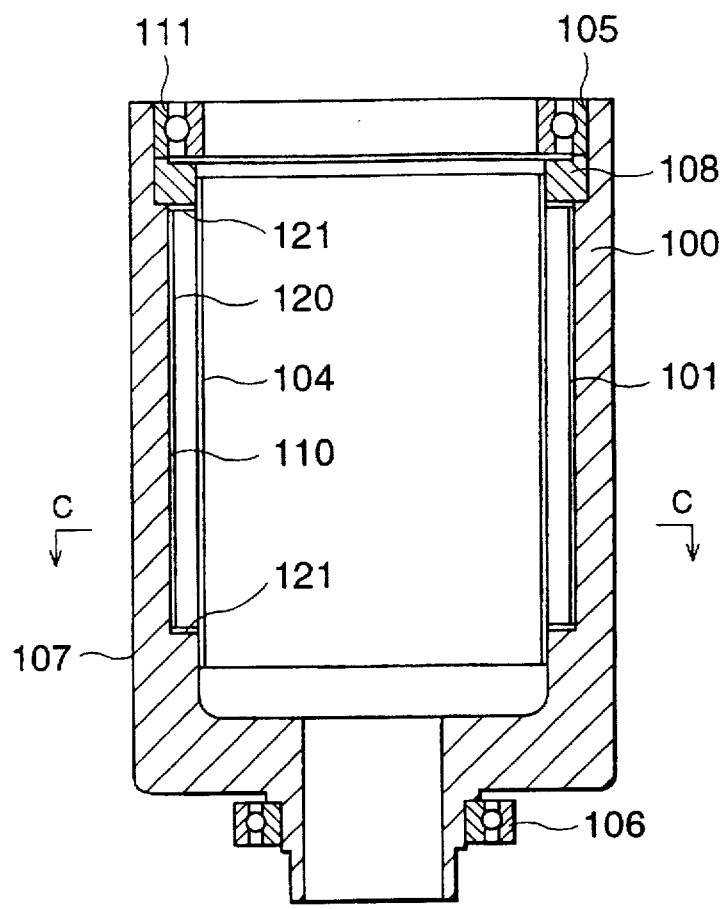
F I G. 7 (a)
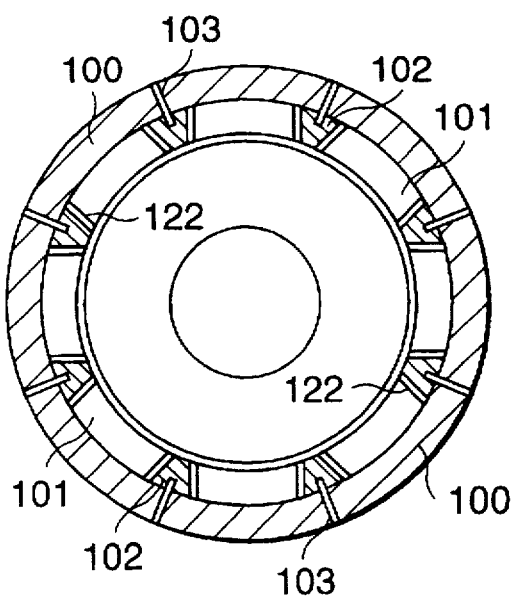
F I G. 7 (b)

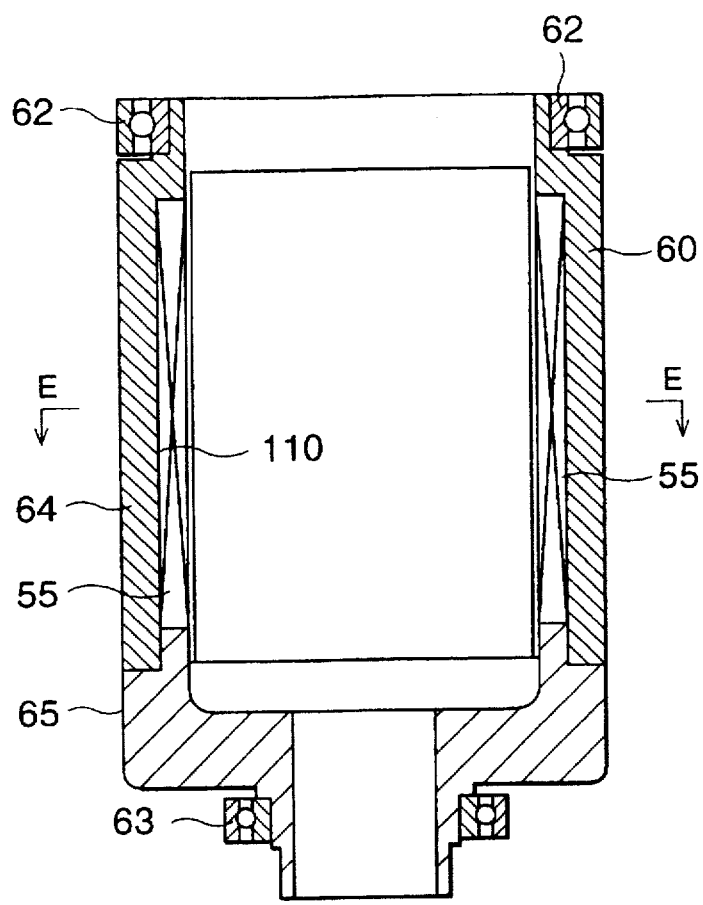
FIG. 30 (a) PRIOR ART
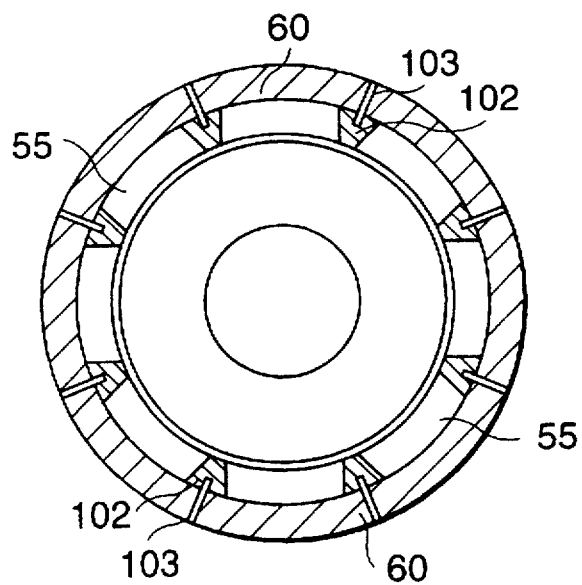
FIG. 30 (b) PRIOR ART

CONTROL ROD DRIVE MECHANISM

BACKGROUND OF THE INVENTION

Technical Field

The present invention relates to a control rod drive mechanism (hereinafter abbreviated to CRD) used in a boiling water reactor (hereinafter abbreviated to BWR) which is a light-water reactor.

A conceptual diagram of the structure of an ordinary BWR is shown in FIG. 22. In this figure, a coolant 2 that also acts as a moderator is accommodated within a reactor pressure vessel (sometimes abbreviated to RPV) 1 and a core 3 is arranged in a central lower portion of the reactor pressure vessel 1, surrounded by a core shroud 4. A large number of fuel assemblies (not shown in the figure) are installed in the core 3, and a control rod 5 is accommodated within each group of four fuel assemblies in a freely insertable manner.

In this BWR, the coolant 2 flows upward within the core 3, during which time the heat generated by nuclear chain reactions is transferred to the coolant 2. The coolant 2 is heated thereby, the heated coolant 2 moves upward in the core 3 in a two-phase form of water and steam, and it is guided from the core 3 into a steam separator 6.

After the two-phase liquid/vapor flow of coolant has been separated in the steam separator 6 into water and steam, the steam is sent from a main steam pipeline through a steam dryer (not shown in the figure) to a steam turbine system, to drive the steam turbine. The steam that has run through the steam turbine system is condensed by a steam condenser, then the resultant condensate is returned via a reactor condensate and water supply system (not shown in the figure) as the water supply to the interior of the reactor pressure vessel 1.

Water that has been separated by the steam separator 6 flows down through a downcomer portion 7 and is guided into a lower portion of the core 3 after being mixed with the water supply that is coming through the reactor condensate and water supply system, so that it is led back into the core 3.

Each of the control rods 5 is moved into and out of the core 3 of the reactor pressure vessel 1 by a control rod drive mechanism 8 in order to start and stop the reactor or adjust its output. This control rod drive mechanism 8 is an integral structure accommodated within a CRD housing 9 that extends upward from a base portion 1a of the reactor pressure vessel 1. It is fixed by bolts to a lower flange 9a of the CRD housing 9.

Each control rod drive mechanism 8 is electrically driven. An electric motor 10 is attached to a lower portion thereof, as shown in FIG. 23, and a rotary shaft 11 of this electric motor 10 is linked to a drive shaft 13 of the control rod drive mechanism 8 by a gear coupling mechanism 12. This drive shaft 13 is linked integrally to a ball screw shaft 14, and a ball nut 15 is screwed onto this ball screw shaft 14.

A pair of rollers 16 are attached to the ball nut 15 in such a manner that they sandwich an attachment plate 18 formed on an inner peripheral surface of a guide tube 17. A hollow piston 19 is disposed above the ball nut 15, and this hollow piston 19 is linked to the corresponding control rod 5 by a coupling 20 attached to the upper end thereof.

An electromagnetic brake 21 is attached to the electric motor 10 in such a manner that the electric motor 10 can be stopped by the operation of this electromagnetic brake 21. A synchro position detector 22 is provided at a lower end of the electromagnetic brake 21 so that the position of the control rod 5 is detected by this synchro position detector 22.

A motor bracket 23 is disposed around the periphery of the gear coupling mechanism 12 above the electric motor 10 and a spool piece 24 is fixed to an upper portion of this motor bracket 23 as a partition for the primary coolant water. The drive shaft 13 passes through this spool piece 24, with a gland packing 25 being used as a sealing member for the drive shaft 13. Rubber O-rings 26 and 27 are used as additional static sealing portions.

A cylinder 29 is fixed to an upper portion of the guide tube 17 with a stop piston 28 therebetween for preventing upward movement beyond the predetermined length of the hollow piston 19. A coil spring 30 is placed between the cylinder 29 and the stop piston 28. A disc spring mechanism 32 is mounted between the cylinder 29 and an upper guide 31.

In the thus configured control rod drive mechanism 8, the ball screw shaft 14 is rotated by the rotational drive of the electric motor 10 which is transmitted by the rotary shaft 11 and the drive shaft 13, in such a manner that the ball nut 15 is moved vertically by the rotation of the ball screw shaft 14.

During this time, the ball nut 15 is moved vertically with rotational motion thereof being controlled by the attachment plate 18 via the rollers, and this vertical movement of the ball nut 15 causes the control rod 5 to be moved vertically by the hollow piston 19. This vertical movement of the control rod 5 adjusts the degree to which it is inserted into and removed from the core 3, thus controlling the reactor output.

The description now turns to a "scram" of the reactor when an emergency occurs in the BWR. When the reactor is scrammed, high-pressure operating water is supplied to a lower surface of the hollow piston 19 through an inlet port 34 from a scram injection pipeline 33 that is connected to the lower flange 9a of the CRD housing 9. This supply of high-pressure operating water causes the reactor to scram by forcing the hollow piston 19 upward from its position on the ball nut 15 and thus inserting the control rod 5 rapidly into the core 3. In this case, the scram position of the hollow piston 19 is detected by a scram position detector 36 which has a reed switch 35 and which detects the position of a magnet 150 attached to the hollow piston 19.

In the above described prior-art control rod drive mechanism 8, the drive shaft 13 passes through the spool piece 24 that acts as a partition for the primary coolant and the gland packing 25 is used as a sealing member for the drive shaft 13. It is not possible to form a complete seal against the primary coolant by rubber seal portions that act as further static seal members, so a certain amount of leakage is permitted. Since the gland packing 25 and rubber O-rings 26 and 27 are non-metallic members, they deteriorate with time and have to be replaced periodically. This causes problems in that the frequency of maintenance is high.

In order to solve this problem, a control rod drive mechanism disclosed in Japanese Patent Application No. 7-32557 transfers the rotational force of the electric motor 10 in a non-contact manner to the ball screw shaft 14 by the force of a magnet through a pressure barrier, removing the need for portions that pass through the pressure barrier.

The invention disclosed in Japanese Patent Application No. 7-32557 will now be described with reference to FIG. 24. A control rod drive mechanism 50 is electrically driven. It is disposed to extend downward from the base portion 1a of the reactor pressure vessel 1 and is fixed by bolts to the lower flange 9a of the CRD housing 9.

An electric motor 51 such as a stepping motor is attached to a lower portion of the control rod drive mechanism 50, and the rotational drive force of this electric motor 51 is transmitted to a drive shaft 53 through a magnetic coupling 52. The magnetic coupling 52 is configured of an inner magnet 54 acting as a first magnet on a driven side provided at a lower portion of the drive shaft 53, and an outer magnet 55 acting as a second magnet on a driving side provided on the shaft of the electric motor 51, separated by a spool piece 56 that acts as a partition for primary coolant on an outer side of the inner magnet 54. Each of the inner and outer magnets 54 and 55 is configured of a circular cylindrical magnet that is divided longitudinally into an even number of parts to give poles that are magnetized alternately in the radial direction.

A section taken along A—A in FIG. 24 is shown in FIG. 25, illustrating the configuration of the magnetic coupling and the principle behind it in a simple fashion. Note that components such as motor brackets are omitted to avoid complicating the diagram unnecessarily. This FIG. 25 shows an example of the use of a magnetic coupling with eight radial poles. Each magnet is a circular cylinder that has been divided longitudinally and magnetized as shown by the arrows in the figure. Neighboring magnetic pieces are attached to an outer yoke 60 and an inner yoke 61 in such a manner that North and South magnetic poles alternate. The relative rotational relationship between an inner rotor 67 and an outer rotor 64 in this figure is a stable phase position in which the forces of attraction and repulsion of the poles are in balance. There are four of these stable phase positions for a magnetic coupling with eight poles.

It should be noted that a pressure partition 58 is provided on a lower portion of the spool piece 56 between the outer magnet 55 and the inner magnet 54. When the inner rotor 67 and outer rotor 64 are displaced at an angle (this angle is hereinafter called the displacement angle) to the stable phase position, as shown in FIG. 26, a torque generated by the forces of attraction and repulsion between the outer magnet 55 and the inner magnet 54 tries to cancel this displacement and return the components to the original stable phase position. The relationship between this torque and the displacement angle is in general as shown by graph of FIG. 27. The torque is at a maximum when the displacement angle is {360÷2÷(number of poles)} degrees, which is 22.5 degrees for an eight-pole magnetic coupling. It starts decreasing away from these angles until it is zero at {360÷(number of poles)} degrees, which is 45 degrees in this case. An angle of {360÷(number of poles)} degrees or less is called the slip generation angle. At an angle of greater than the slip generation angle, torque acts to promote displacement in the opposite direction to cause the components to approach the next stable phase position.

Therefore, the magnetic coupling cannot be loaded by a torque in excess of the maximum static torque. If a larger torque is applied such that the displacement angle exceeds 45 degrees, the inner rotor 67 and outer rotor 64 rotate relative to one another as far as the next stable phase position. In this case, the configuration cannot return to the original stable phase position, even if the excess load is removed. This is called slipping of the magnetic coupling. As will be described later, it is necessary to design the torque to ensure that there is sufficient slack with respect to the assumed load torque, to prevent the generation of such slipping with a control rod drive mechanism which uses a magnetic coupling.

Returning to FIG. 24, the drive shaft 53 is linked to the ball screw shaft 14 and the rotational drive force of the drive shaft 53 is transmitted to the ball screw shaft 14. The resultant rotation of the ball screw shaft 14 is converted into vertical movement of the ball nut 15, and the mechanism for raising and lowering the hollow piston by the ball screw shaft 14, ball nut 15, and rollers 16 is similar to the prior-art example shown in FIG. 23.

A motor bracket 57 is disposed around the periphery of the magnetic coupling 52 above the electric motor 51.

A metal O-ring 66 is used as a sealing member between the spool piece 56 and the lower flange 9a of the CRD housing 9. Leakage of the primary coolant is prevented by this metal O-ring 66, and also the maintenance frequency thereof is reduced in comparison to a rubber O-ring.

In the thus configured control rod drive mechanism 50, the drive shaft 53 is rotated by the rotational drive of the electric motor 51, via the magnetic coupling 52. In other words, the outer magnet 55 on the driving side is rotated by the rotational drive force of the electric motor 51, the inner magnet 54 on the driven side is rotated in accordance with this rotation, and the drive shaft 53 is rotated thereby. When the drive shaft 53 rotates, the ball screw shaft 14 is rotated, causing the ball nut 15 to be driven vertically (raised or lowered). The control rod 5 is moved vertically by the hollow piston 19 in accordance with this raising or lowering of the ball nut 15 to adjust the reactor output.

The control rod 5 is held at the insertion position by controlling the rotation of the ball screw shaft 14 by the inherent torque of the electric motor 51 itself.

On the other hand, the operation when the reactor is scrammed is the same as that of the prior-art example shown in FIG. 23.

In the prior-art example shown in FIG. 24, the control rod drive mechanism 50 does not require a sealing portion for the drive shaft 53 because of the arrangement of the magnetic coupling 52, which is configured of the inner magnet 54 on the driven side arranged at a lower portion of the drive shaft 53 and the outer magnet 55 on the driving side provided on the electric motor 51 and separated by the spool piece 56 from the outer side of the inner magnet 54. Since no components pass through the spool piece 56, there is no need for shaft-sealing members such as the gland packing that was necessary previously.

A partial cross-sectional view through a magnetic coupling integrity diagnosis apparatus that can be applied to the control rod drive mechanism 50 of FIG. 24 is shown in FIG. 28(a), and a cross-sectional view thereof taken along the line D—D in FIG. 28(a) is shown in FIG. 28(b). Note that, since the only portions in FIG. 28(a) that differ from the embodiment shown in FIG. 24 are the lower portion of the spool piece 56 and the peripheral portions thereof, only those portions are shown. A hollow cylindrical portion below the spool piece 56 is the pressure partition 58. This pressure partition 58 is not shown in section in FIG. 28(a). In this prior-art technique, a linear or planar conductor is arranged between the inner magnet 54 (first magnet) and outer magnet 55 (second magnet). A linear conductor 59 is shown attached to the outer peripheral surface of the pressure partition 58 in FIG. 28(a), in a configuration that zigzags repeatedly in the vertical (axial) direction. Part of the magnetic field between the inner and outer magnets 54 and 55 is also shown in FIG. 28(a), with a magnetic path being formed by the inner magnet 54, the outer magnet 55, the outer yoke 60, the inner yoke 61, and a gap between the inner and outer magnets 54 and 55 to generate the magnetic field shown in this figure. While the drive is active, the inner and outer magnets 54 and 55 rotate in synchronism and thus the magnetic field thereof maintains substantially the same distribution as that while the structure is stationary.

The rotational magnetic field generated by this rotation of the inner and outer magnets 54 and 55 generates an induction voltage in the axial direction of the conductor 59, in the parts thereof that extend in the vertical direction. This electromotive force causes a periodic voltage of the waveform shown in FIG. 29 between the ends of the conductor 59, provided the rotational speed of the magnets is constant. Note that the waveform shown in this figure is trapezoidal, but this waveform will differ slightly depending on the shape of the magnets and will tend to have longer flat portions at top and bottom when wider magnets are used. The amplitude of this voltage is determined by the inner and outer magnets 54 and 55. It is proportional to the magnetic flux density in the gap between these magnets. Therefore, the magnetic force of the magnets can be determined by measuring the amplitude of this voltage, making it possible to check whether or not the magnetic force has deteriorated while the plant is in operation, without having to disassemble and inspect the control rod drive mechanism and the spool piece.

Details of the configuration around the outer magnet 55 are shown in (a) and (b) of FIG. 30. The separate parts of the outer magnet 55 (second magnet) arranged at a predetermined spacing along the inner peripheral wall of the outer yoke 60 are disposed within the outer rotor 64, which is supported at each end by an upper bearing 62 and a lower bearing 63. These outer magnets 55 are attached by pins 103 with magnet fixing members 102 therebetween.

In general, when an attempt is made to bring a magnetized magnet close to a yoke in the radial direction, to install it, the force of attraction between the magnet and the yoke makes assembly difficult, so the magnet may become damaged by excessive force during installation. To prevent this, the usual method is to install the magnet at the correct position by bringing the magnet into contact with a magnet installation surface 110 of the yoke and allowing it to slide over that surface. In the invention disclosed in Japanese Patent Application No. 7-32557, an upper end portion of the outer yoke 60 is shaped with an inner side that is narrowed to enable the attachment of the upper bearing 62. Thus the flange 65 and the outer yoke 60 are configured to have a split structure, the outer magnet 55 are installed from above, and then the flange 65 is attached to the outer yoke 60.

The thus configured prior-art control rod drive mechanism has certain problems, as described below.

When the flange 65 and outer yoke 60 are formed as a split structure as shown in FIG. 30, the driving power of the motor is applied to the flange 65 and thus a welded structure or a structure wherein rotation is prevented by keys and pins is employed at the connection thereof with the outer yoke 60. It is also necessary to increase the rigidity of these portions by means such as increasing the thicknesses thereof. Thus the configuration is more complicated than an integral structure and the number of fabrication steps thereof is larger. The outer rotor 64 is also heavier, necessitating a larger motor drive force.

There is a further problem that is common to the prior-art control rod drive mechanism of FIG. 24 and another invention disclosed in Japanese Patent Application No. 7-32557. If the insertion operation by the electric motor 10 is performed in a state in which friction is high due to contact between the core and the control rod, the control rod is not inserted smoothly and an excessive load it applied to the ball screw shaft 14, ball nut 15, and other components, making it likely that damage will occur. It is possible that even the fuel will be damaged. Inspection to determine the magnitude of this frictional force is performed during periodical maintenance.

Another known problem that concerns the invention disclosed in Japanese Patent Application No. 7-32557 lies in the fact that the application of friction to magnets generally lowers the magnetic force thereof slightly. Although this effect is small, it is likely that frictional loads occurring during a scram and earthquake loads could be applied to the magnets.

Another problem concerns the magnetic coupling integrity diagnosis apparatus. If there is a disconnection between the inner and outer magnets or if an insulating body (not shown in the figure) around the magnets deteriorates, it will be necessary to remove the hollow piston and the spool piece from the control rod drive mechanism, for repair or replacement.

If slipping of the magnetic coupling occurs in the prior-art control rod drive mechanism, a deviation will occur between the position of the control rod detected by the synchro position detector 22 and the actual position of the control rod, which could cause a breakdown in the operation of the plant. To prevent this, the magnetic coupling is designed to have a transfer torque that is sufficient to overcome the maximum load torque to be expected. In addition, if slipping should happen to occur, the provision of a means for detecting such slipping would make it possible to rapidly initiate necessary measures for stopping the reactor, thus improving plant reliability.

The present invention was devised with the intention of solving the above described problems with the prior art. An objective thereof is to provide a control rod drive mechanism which has a structure of an increased rigidity, can be expected to have a more reliable function of detecting the operating state of the control rod even while the plant is operating, and can simultaneously facilitate repair and replacement.

Another objective of the present invention is to provide a control rod drive mechanism that is capable of detecting any slipping in the magnetic coupling.

SUMMARY OF THE INVENTION

In order to achieve the above objectives, the control rod drive mechanism of this invention disclosed in claim 1 of this specification concerns a control rod drive mechanism for transmitting the rotation of an electric motor via a drive shaft to an elevator apparatus for raising and lowering a hollow piston on an upper end of which is provided a control rod that controls the output of a nuclear reactor, to insert this control rod into a reactor core or remove it therefrom, and also insert the control rod rapidly into the core during a scram by the injection of high-pressure water to force the hollow piston upward; wherein the control rod drive mechanism comprises: a magnetic coupling having an inner magnet, which is divided into a plurality of parts and is disposed at a lower portion of the drive shaft in order to transmit the rotational power of an electric motor to the drive shaft, and a driven-side outer magnet, which is divided into a plurality of parts and is provided on a rotary shaft of the electric motor in an arrangement on an outer side of the inner magnet; and a circular cylindrical outer yoke mounted on an inner surface side of the outer magnet; wherein a radial-direction position on a magnet installation surface for the outer magnet on the outer yoke is the same as a radial-direction position on an inner surface of the outer yoke above the magnet installation surface for the outer magnet, or further inward therefrom.

The invention disclosed in claim 2 of this specification is based on the invention of claim 1 but is further characterized in that a ring is provided for mounting a bearing on an inner surface of the outer yoke, above the installation surface for the outer magnet.

The invention disclosed in claim 3 of this specification is based on the invention of claim 1, with the addition of a conductor disposed between the inner and outer magnets in such a manner that an induction voltage caused by a rotational magnetic field generated by the rotation of the inner and outer magnets is generated in the conductor, and changes in the waveform of the induction voltage that are caused by changes in the torque angle formed between the inner and outer magnets are detected.

The invention disclosed in claim 4 of this specification is based on the invention of claim 3, but further comprises means for measuring changes in the waveform of the induction voltage and thus inferring the torque angle.

The invention disclosed in claim 5 of this specification is based on the invention of claim 4, except that the means for inferring the torque angle uses the left-right symmetry of a time-history waveform of a half-period of the induction voltage waveform.

The invention disclosed in claim 6 of this specification is based on the invention of claim 5, except that the left-right symmetry of the time-history waveform of a half-period of the induction voltage waveform is evaluated by comparison of voltages in two regions separated by an intermediate time within the half-period.

The invention disclosed in claim 7 of this specification is based on the invention of claim 4, but further comprises means for inferring from the torque angle the magnitude of load applied to the elevator apparatus of the hollow piston.

The invention disclosed in claim 8 of this specification is based on the invention of claim 1, except that a coating is applied to a surface of at least one of the inner and outer magnets.

The invention disclosed in claim 9 of this specification is based on the invention of claim 1, except that a resilient body is provided in at least one location in a space between at least one of the inner and outer magnets and a member that is adjacent thereto in an axial, radial, or peripheral direction.

The invention disclosed in claim 10 of this specification is based on the invention of claim 1, except that a resilient body is provided in a space between divided parts of at least one of the inner and outer magnets, which are each divided into a plurality of parts.

The invention disclosed in claim 11 of this specification is based on the invention of claim 1, except that a resilient body is provided in a space between the outer yoke and the outer magnet.

The invention disclosed in claim 12 of this specification is based on the invention of claim 1, except that a magnetic sensor for determining a magnetic field generated from the inner and outer magnets is provided in an outer peripheral portion of a housing accommodating the magnetic coupling.

The invention disclosed in claim 13 of this specification is based on the invention of claim 1, except that a magnetic sensor for determining a magnetic field generated from the inner and outer magnets is provided in an outer peripheral portion of a housing accommodating the magnetic coupling.

The invention disclosed in claim 14 of this specification is based on the invention of claim 13, except that the magnetic sensor can be installed and removed from the outside of the housing accommodating the magnetic coupling.

The invention disclosed in claim 15 of this specification is based on the invention of claim 1, except that rotational support of the inner and outer magnets is provided by a sliding bearing.

The invention disclosed in claim 16 of this specification concerns a control rod drive mechanism for controlling the output of a nuclear reactor, wherein the control rod drive mechanism is provided within a housing extending from a lower portion of the nuclear reactor; the rotation of an electric motor is transmitted via a drive shaft to a hollow piston elevator mechanism, to raise or lower the hollow piston; and thus a control rod linked to the hollow piston is inserted into or removed from a core of the reactor; the control rod drive mechanism comprising: a spool piece provided at a lower end portion of the housing for sealing a primary coolant within the reactor; an outer yoke provided outside a lower portion of the spool piece and connected to a rotary shaft of the electric motor; an outer magnet provided on the outer yoke; an inner yoke provided within the spool piece and attached to the drive shaft, which is connected to the hollow piston elevator mechanism; an inner magnet provided on the inner yoke; and means for detecting the rotation of the inner magnet.

The invention disclosed in claim 17 of this specification is based on the invention of claim 16, except that the rotation detection means comprises a rotary member, which is provided on the drive shaft that rotates together with the inner magnet and which has indentations formed in a side surface thereof, and a deflection detector, which is provided on a rotating horizontal plane facing the rotary member and which measures the distance to the indentations formed in the surface of the rotary member.

The invention disclosed in claim 18 of this specification is based on the invention of claim 16, but is further provided with an output processing means for comparing an output from the rotation detection means of the inner magnet and an output of a retinal position detection means for detecting the shaft rotation of the rotary shaft of the electric motor.

The invention disclosed in claim 19 of this specification is based on the invention of claim 18, except that the rotation detection means of the inner magnet is replaced by a control rod position detection means for detecting a vertical position resulting from the insertion or removal of the control rod.

The invention disclosed in claim 20 of this specification concerns a control rod drive mechanism for controlling the output of a nuclear reactor, wherein the control rod drive mechanism is provided within a housing extending from a lower portion of the nuclear reactor; the rotation of an electric motor is transmitted via a drive shaft to a hollow piston elevator mechanism, to raise or lower the hollow piston; and thus a control rod linked to the hollow piston is inserted into or removed from a core of the reactor; the control rod drive mechanism comprising: a spool piece provided at a lower end portion of the housing for sealing a primary coolant within the reactor; an outer yoke provided outside a lower portion of the spool piece and connected to a rotary shaft of the electric motor; an outer magnet provided on the outer yoke; an inner yoke provided within the spool piece and attached to the drive shaft, which is connected to the hollow piston elevator mechanism; an inner magnet provided on the inner yoke; and means for detecting a phase difference between a current and voltage of the electric motor and thus inferring the torque of the electric motor.

The invention disclosed in claim 21 of this specification concerns a control rod drive mechanism for controlling the output of a nuclear reactor, wherein the control rod drive mechanism is provided within a housing extending from a lower portion of the nuclear reactor; the rotation of an electric motor is transmitted via a drive shaft to a hollow piston elevator mechanism, to raise or lower the hollow piston; and thus a control rod linked to the hollow piston is inserted into or removed from a core of the reactor; the control rod drive mechanism comprising: a spool piece provided at a lower end portion of the housing for sealing a primary coolant within the reactor; an outer yoke provided outside a lower portion of the spool piece and connected to a rotary shaft of the electric motor; an outer magnet provided on the outer yoke; an inner yoke provided within the spool piece and attached to the drive shaft, which is connected to the hollow piston elevator mechanism; an inner magnet provided on the inner yoke; and frequency analysis means for analyzing a current waveform of the electric motor.

The invention disclosed in claim 22 of this specification is based on the invention of claim 21, except that the frequency analysis means for analyzing a current waveform of the electric motor is replaced by a frequency analysis means for analyzing a voltage waveform of the electric motor.

The invention disclosed in claim 23 of this specification concerns a control rod drive mechanism for controlling the output of a nuclear reactor, wherein the control rod drive mechanism is provided within a housing extending from a lower portion of the nuclear reactor; the rotation of an electric motor is transmitted via a drive shaft to a hollow piston elevator mechanism, to raise or lower the hollow piston; and thus a control rod linked to the hollow piston is inserted into or removed from a core of the reactor; the control rod drive mechanism comprising: a spool piece provided at a lower end portion of the housing for sealing a primary coolant within the reactor; an outer yoke provided outside a lower portion of the spool piece and connected to a rotary shaft of the electric motor; an outer magnet provided on the outer yoke; an inner yoke provided within the spool piece and attached to the drive shaft, which is connected to the hollow piston elevator mechanism; an inner magnet provided on the inner yoke; and means for detecting the load torque of the electric motor; wherein the electric motor is an induction motor and the means for detecting the load torque of the electric motor detects the load torque from the rotational speed of the electric motor.

The invention disclosed in claim 24 of this specification concerns a control rod drive mechanism for controlling the output of a nuclear reactor, wherein the control rod drive mechanism is provided within a housing extending from a lower portion of the nuclear reactor; the rotation of an electric motor is transmitted via a drive shaft to a hollow piston elevator mechanism, to raise or lower the hollow piston; and thus a control rod linked to the hollow piston is inserted into or removed from a core of the reactor; the control rod drive mechanism comprising: a spool piece provided at a lower end portion of the housing for sealing a primary coolant within the reactor; an outer yoke provided outside a lower portion of the spool piece and connected to a rotary shaft of the electric motor; an outer magnet provided on the outer yoke; an inner yoke provided within the spool piece and attached to the drive shaft, which is connected to the hollow piston elevator mechanism; an inner magnet provided on the inner yoke; and torque detection means for detecting the torque applied to the rotary shaft of the electric motor or the drive shaft that is linked to the electric motor.

The invention disclosed in claim 25 of this specification is based on the invention of claim 24, but further comprises slipping detection means for detecting slippage generated between the outer and inner magnets, using the detected torque.

The invention disclosed in claim 26 of this specification concerns a control rod drive mechanism for controlling the output of a nuclear reactor, wherein the control rod drive mechanism is provided within a housing extending from a lower portion of the nuclear reactor; the rotation of an electric motor is transmitted via a drive shaft to a hollow piston elevator mechanism, to raise or lower the hollow piston; and thus a control rod linked to the hollow piston is inserted into or removed from a core of the reactor; the control rod drive mechanism comprising: a spool piece provided at a lower end portion of the housing for sealing a primary coolant within the reactor; an outer yoke provided outside a lower portion of the spool piece and connected to a rotary shaft of the electric motor; an outer magnet provided on the outer yoke; an inner yoke provided within the spool piece and attached to the drive shaft, which is connected to the hollow piston elevator mechanism; an inner magnet provided on the inner yoke; and strain detection means for detecting strain generated in a stator of the electric motor or a member for fixing this stator to a reactor pressure vessel.

The invention disclosed in claim 27 of this specification is based on the invention of claim 26, except that the strain detection means is replaced by a strain detection means for detecting strain generated in a brake that restricts the rotation of the rotary shaft or a member for fixing this brake to a reactor pressure vessel.

The invention disclosed in claim 28 of this specification concerns a control rod drive mechanism for controlling the output of a nuclear reactor, wherein the control rod drive mechanism is provided within a housing extending from a lower portion of the nuclear reactor; the rotation of an electric motor is transmitted via a drive shaft to a hollow piston elevator mechanism, to raise or lower the hollow piston; and thus a control rod linked to the hollow piston is inserted into or removed from a core of the reactor; the control rod drive mechanism comprising: a spool piece provided at a lower end portion of the housing for sealing a primary coolant within the reactor; an outer yoke provided outside a lower portion of the spool piece and connected to a rotary shaft of the electric motor; an outer magnet provided on the outer yoke; an inner yoke provided within the spool piece and attached to the drive shaft, which is connected to the hollow piston elevator mechanism; an inner magnet provided on the inner yoke; and acceleration detection means for detecting the rotational acceleration generated in a stator of the electric motor or a member for fixing this stator to a reactor pressure vessel.

The invention disclosed in claim 29 of this specification is based on the invention of claim 28, except that the acceleration detection means is replaced by an acceleration detection means for detecting the rotational acceleration generated in a brake that restricts the rotation of the rotary shaft or a member for fixing this brake to a reactor pressure vessel.

With the control rod drive mechanism of the above described configuration, the invention disclosed in claim 1 of this specification makes it possible to install the outer magnet (second magnet) from above the outer yoke, while allowing it to slide along a magnet installation surface.

The invention disclosed in claim 2 makes it possible to install the outer magnet from above the outer yoke, while allowing it to slide along a magnet installation surface, without being concerned about the positional relationship between the bearing installation surface and the magnet installation surface, by making the outer yoke and the component that holds the bearing above the outer yoke as a divided structure.

The invention disclosed in claims 3, 4, 5, and 7 uses the facts that the torque angle of the inner and outer magnets depends on the load torque and that the time-history waveform of the induced voltage changes with changes in the torque angle, to make it possible to measure the magnitude of the load applied to the hollow piston—elevator mechanism.

The invention disclosed in claim 6 makes it possible to measure the magnitude of the load by concentrating on the symmetry of the waveform, within the historical record of the waveform.

The invention disclosed in claims 8 to 11 has the effect of buffering impacts, by virtue of resilient bodies disposed between the structural members.

The invention disclosed in claims 12 to 14 makes it possible to measure the magnitude of the magnetic force of the magnets, by measuring the magnitude of the leakage flux from the upper end portions of the inner and outer magnets. If slipping occurs when the components of the magnetic coupling not rotating in synchronism, this occurrence can be detected from changes in the output waveform of a magnetic sensor. If the magnetic sensor fails or deteriorates, it can be replaced or repaired without disassembling the control rod drive mechanism or the electric motor.

The invention disclosed in claim 15 makes it possible to produce a buffering effect with respect to vibration, by using a sliding bearing, and also enables greater flexibility in deciding the dimensions than with a roller bearing.

The configuration of the control rod drive mechanism of this invention disclosed in claims 16 to 18 make it possible to compare the rotational position of the inner magnet and the rotational position of the outer magnet, and thus detect slipping of the magnets.

The configuration of the control rod drive mechanism of this invention disclosed in claim 19 makes it possible to detect slipping of the inner and outer magnets.

The configuration of the control rod drive mechanism of this invention disclosed in claims 20 to 23 makes it possible to detect changes in the torque generated after slipping, by detecting the torque applied to the electric motor.

The configuration of the control rod drive mechanism of this invention disclosed in claims 24 and 25 makes it possible to detect changes in the torque generated after slipping.

The configuration of the control rod drive mechanism of this invention disclosed in claims 26 and 27 makes it possible to detect the torque generated after slipping, by detecting the strain generated in a stator of the electric motor or a member for fixing this stator to the reactor pressure vessel or in a brake that restricts the rotation of the rotary shaft or a member for fixing this brake to the reactor pressure vessel.

The configuration of the control rod drive mechanism of this invention disclosed in claims 28 and 29 makes it possible to detect changes in the torque generated after slipping, by detecting the rotational acceleration generated in a stator of the electric motor or a member for fixing this stator to the reactor pressure vessel or in a brake that restricts the rotation of the rotary shaft or a member for fixing this brake to the reactor pressure vessel.

BRIEF DESCRIPTION OF THE DRAWINGS

FIG. 7(a) is a vertical cross-sectional view through a fifth embodiment of a control rod drive mechanism of the present invention and FIG. 7(b) is a section taken along the line C—C of FIG. 7(a);

FIG. 30(a) is an enlarged, vertical cross-sectional view of a portion of the magnetic coupling integrity apparatus in a prior-art example of a control rod drive mechanism and FIG. 30(b) is a section taken along the line D—D of second detail value FIG. 30(a).

DESCRIPTION OF THE PREFERRED EMBODIMENTS

Embodiments of the present invention will be described below with reference to the accompanying figures.

Figure 1A:
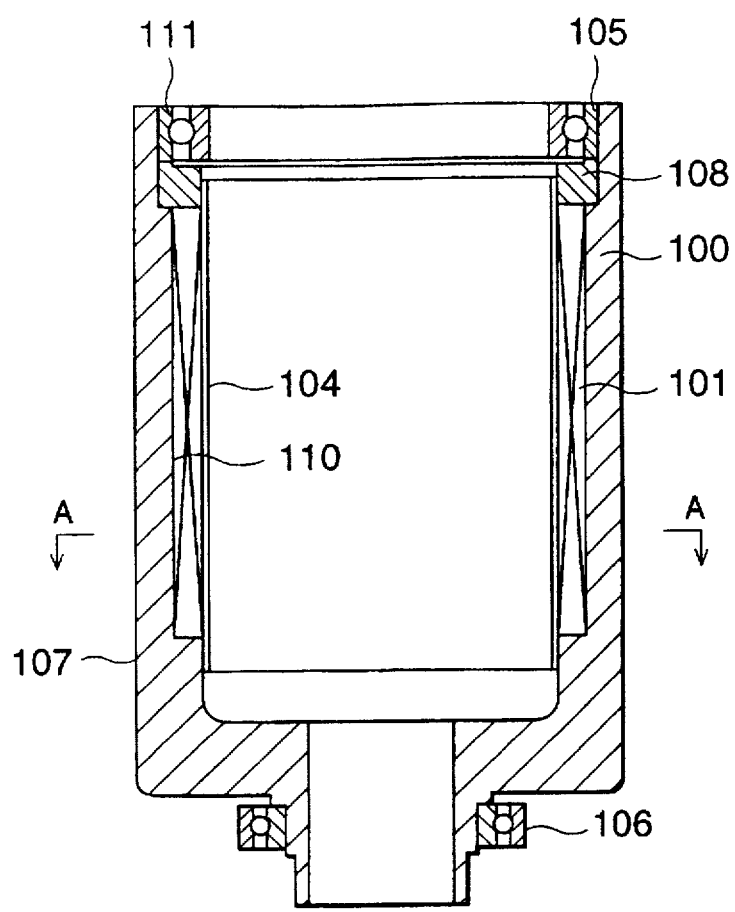
FIG. 1(a) is a vertical cross-sectional view through a first embodiment of a control rod drive mechanism of the present invention and FIG. 1(b) is a section taken along the line A—A of FIG. 1(a)
Figure 1B:
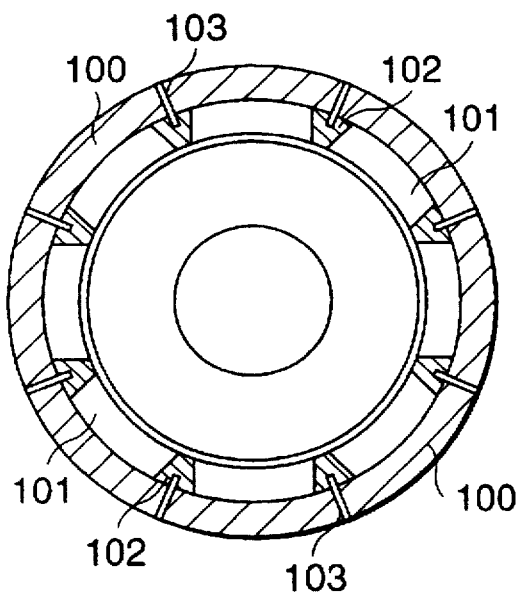

The description below concerns a first embodiment of a control rod drive mechanism in accordance with this invention, based on FIG. 1. Parts (a) and (b) of FIG. 1 are enlarged view of components that correspond to the second magnet of FIG. 24. An outer rotor 107, supported at each end by an upper bearing 105 and a lower bearing 106, is configured of an outer yoke 100, an outer sleeve 104, an outer magnet 101, and a spacer 108. A plurality of magnet fixing members 102 for fixing the parts of the outer magnet 101 (second magnet) at a predetermined spacing along the inner peripheral wall of the outer yoke 100 are each fixed thereto by a pin 103.

A lower portion of the outer sleeve 104 is fixed to the inner peripheral side of a lower portion of the outer yoke 100 by means such as welding. After the outer magnet 101 has been inserted from above into a space defined by the outer yoke 100, the plurality of magnet fixing members 102, and the outer sleeve 104, the spacer 108 is inserted over the outer magnet 101, then the spacer 108 is fixed to each of the outer yoke 100 and the outer sleeve 104 by means such as welding or pins to complete the assembly of the outer portion. The outer magnet 101 is connected to the outer yoke 100 by the magnet installation surface 110. It should be noted, however, that the spacer 108 could also be formed as an integral structure together with the outer sleeve 104.

In general, when an attempt is made to bring a magnetized magnet close to a yoke in the radial direction, to install it, the force of attraction between the magnet and the yoke makes assembly difficult, so the magnet can become damaged by over-vigorous handling during installation. To prevent this, the usual method is to install the magnet at the correct position while bringing it into contact with the magnet installation surface of the yoke and allowing it to slide over that surface. Methods of enabling this installation that have been considered include one in which the outer magnet is installed from above in a condition that an inner surface of the outer yoke above the upper edge of the magnet has been positioned further outward than the radial-direction position of the magnet installation surface. In another method, the magnet is installed from below in a condition that an inner surface of the outer yoke below the lower edge of the magnet has been positioned further outward than the radial-direction position on the magnet installation surface. However, with the latter method, the lower portion of the outer yoke 100 has a flange portion for linkage with the motor shaft, the necessity arises to make the flange portion and the outer yoke a divided structure, and thus this structure has an advantage over an embodiment that enables an integral structure in that the flange portion that is subjected to the motor's power can be made more rigid.

Figure 2A:
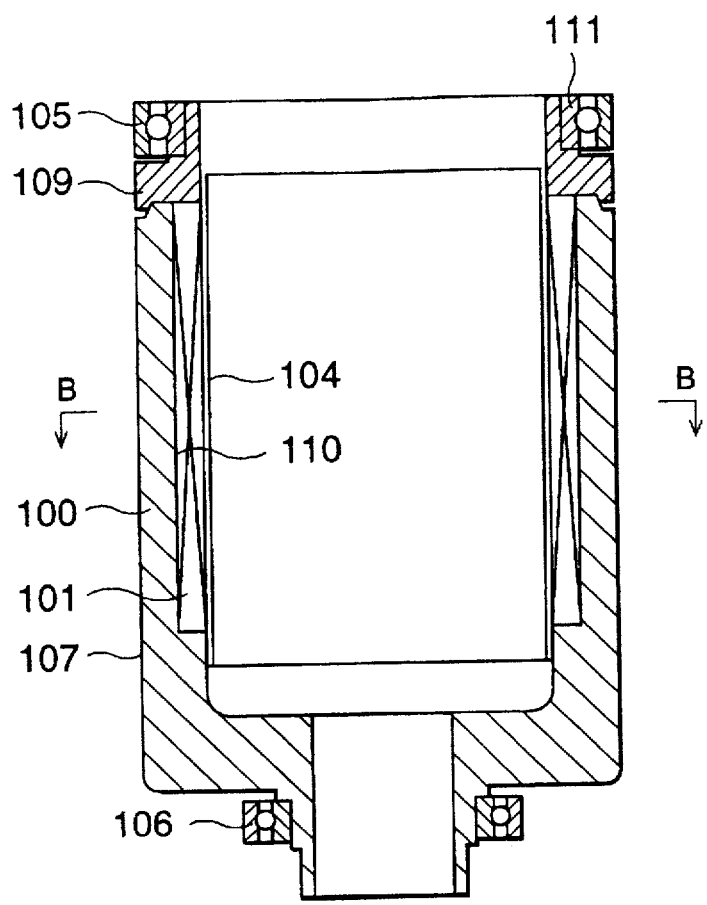
FIG. 2(a) is a vertical cross-sectional view through a second embodiment of a control rod drive mechanism of the present invention and FIG. 2(b) is a section taken along the line B—B of FIG. 2(a)
Figure 2B:
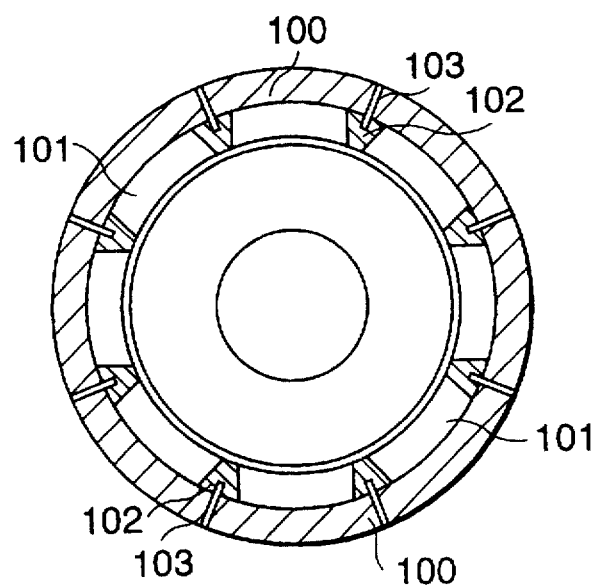

Cross-sectional views through a second embodiment of a control rod drive mechanism in accordance with this invention are shown in FIGS. 2(a) and 2(b). The configuration is such that a ring 109 in which is installed a rolling bearing fits into an upper portion of the outer yoke 100. Alignment between the ring 109 and the outer yoke 100 is enabled by the provision of mating surfaces thereof. In this example, the upper bearing 105, which is a rolling bearing, is used in such a manner that the inner ring rotates but the outer ring is fixed. When the outer yoke 100 is assembled, the outer magnet 101 is inserted from above into a space defined by the outer yoke 100, the plurality of magnet fixing members 102, and the outer sleeve 104, then the ring 109 is fitted onto the outer magnet 101 and the ring 109 is fixed to each of the outer yoke 100 and the outer sleeve 104 by means such as welding. In this embodiment, a bearing installation surface 111 lies further inward than the magnet installation surface 110, but assembling the outer magnet 101 before the ring 109 is mounted on the outer yoke 100 makes it possible to use the above-described method of installing the magnet at the correct position while bringing it into contact with the magnet installation surface 110 and allowing it to slide. This means that the dimensions of the bearing can be selected flexibly. Note that the fixing of the ring 109 to the outer yoke 100 is not limited to welding; a fixing method involving pinning or tightening springs can equally well be used. If a magnetic material is used for the ring 109, the fixing could be by the force of attraction between the ring and the outer magnet 101. Alternatively, the ring 109 and outer sleeve 104 could be of an integral construction.

Note that, although a rolling bearing is used in each of the first and second embodiments, the bearing is not limited thereto. It could equally well be a sliding bearing making use of a material such as white metal, a material impregnated with lubricating oil, or a plastic. An impregnated bearing is generally a porous material with a Young's modulus that is generally less than that of a metal. The oil film of a sliding bearing is thicker than that of a rolling bearing where the surface pressure between the rotating body and the ball race is high and hence the oil film is thin. This provides an increased resistance to vibration, and thus can be expected to have the effect of maintaining the integrity of the magnets with respect to impact loads when the control rod drive mechanisms are scrammed and vibration during an earthquake. It also enables more flexibility concerning dimension, than with rolling bearings where dimensions are determined by regulations.

Although the outer yoke 100 and magnet fixing members 102 are separate components fixed together with pins in each of the first and second embodiments, the configuration is not limited thereto. The outer yoke 100 and magnet fixing members 102 could equally well be manufactured as a single integral structure by means such as forging. This would make it possible to shorten the manufacturing time and also reduce the manufacturing costs.

Figure 3:
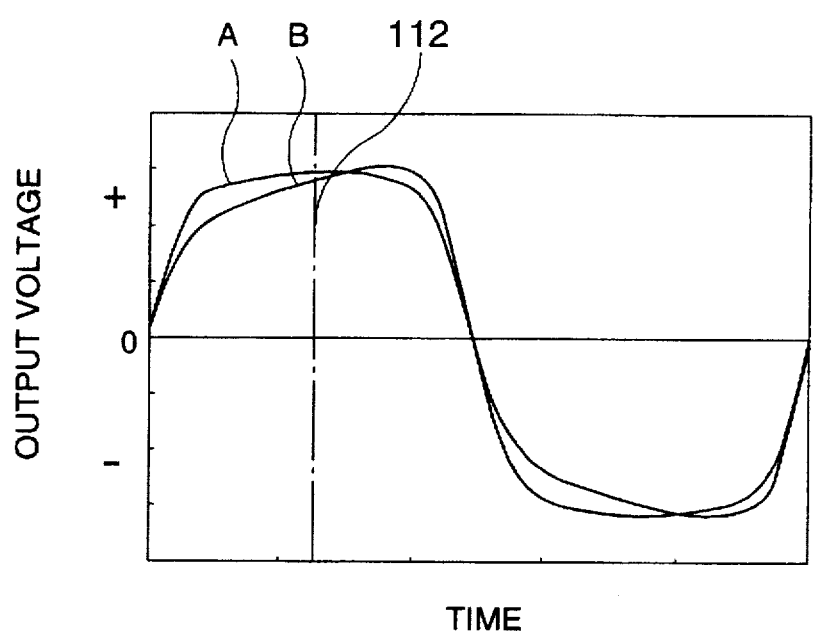
FIG. 3 is a graph of output waveforms of a magnetic coupling integrity diagnosis apparatus of a third embodiment of a control rod drive mechanism of the present invention.
Figure 28:
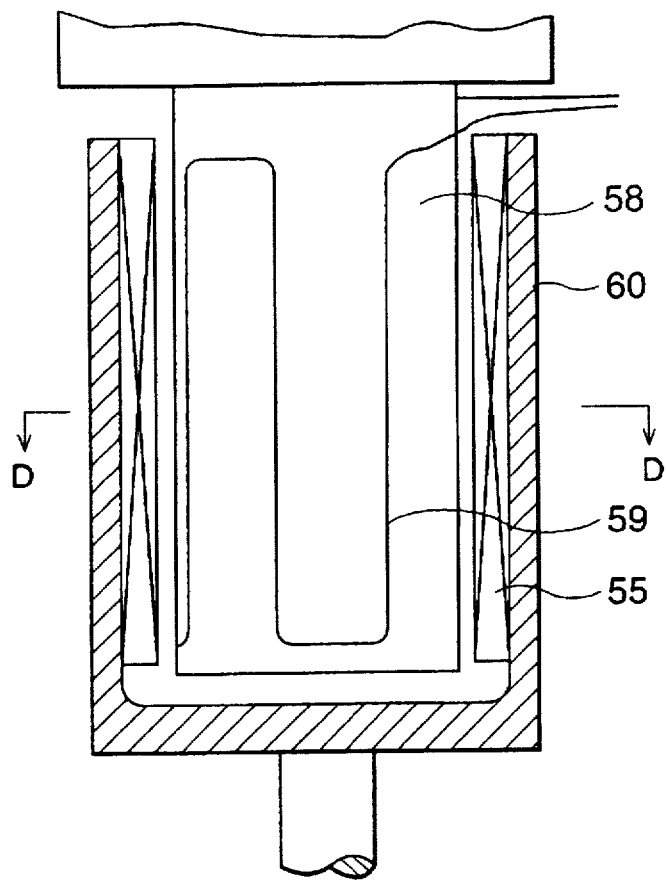
FIG. 28(a) is an enlarged, vertical cross-sectional view of a portion of the magnetic coupling integrity apparatus in a prior-art example of a control rod drive mechanism
FIG. 28(b) is a section taken along the line D—D of second detail value FIG. 28(a)
Figure 28:
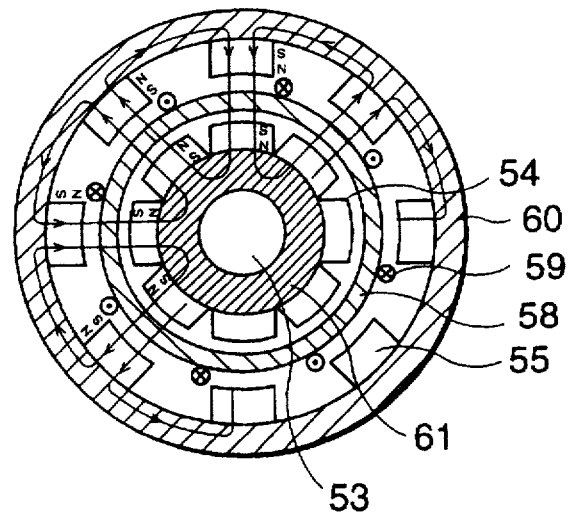
Figure 29:
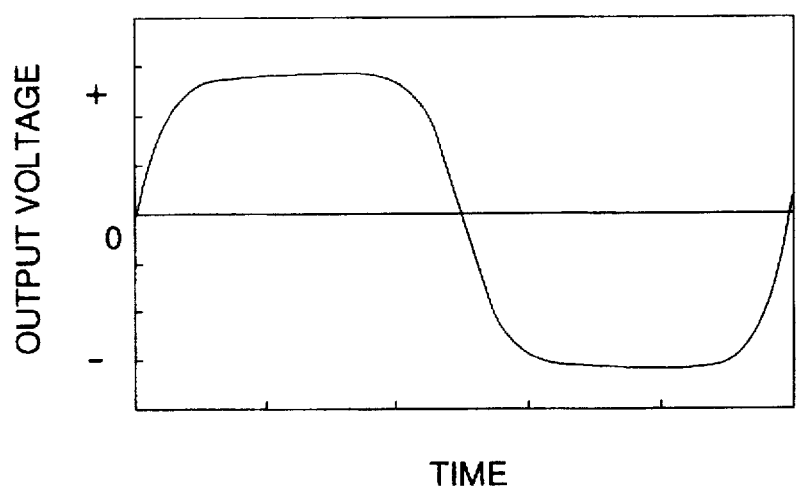
FIG. 29 is a graph of the output waveform of the magnetic coupling integrity apparatus in the prior-art example of a control rod drive mechanism.

A third embodiment of a control rod drive mechanism in accordance with this invention will now be described with reference to FIGS. 3 to 5. FIG. 3 shows an example of the output voltage waveform that occurs when the first and second magnets rotate in synchronization in the magnetic coupling integrity diagnosis apparatus of FIG. 28. This example illustrates an eight-pole configuration, but since these form four assemblies of North and South poles of magnets, four cycles of the voltage waveform occur in the first and second magnets during one rotation. One of these cycles is shown in FIG. 3. The left-hand half of this graph illustrates a half-cycle formed when the output is positive; the right-hand half is similar. An axis 112 is positioned at a temporally central portion within that half-cycle. The waveform denoted by A is an example of the voltage waveform that occurs when no load is applied to the magnetic coupling. It is substantially symmetrical about the axis 112. However, this symmetry collapses in a waveform denoted by B, which illustrates a state in which a load torque is applied.

Figure 4:
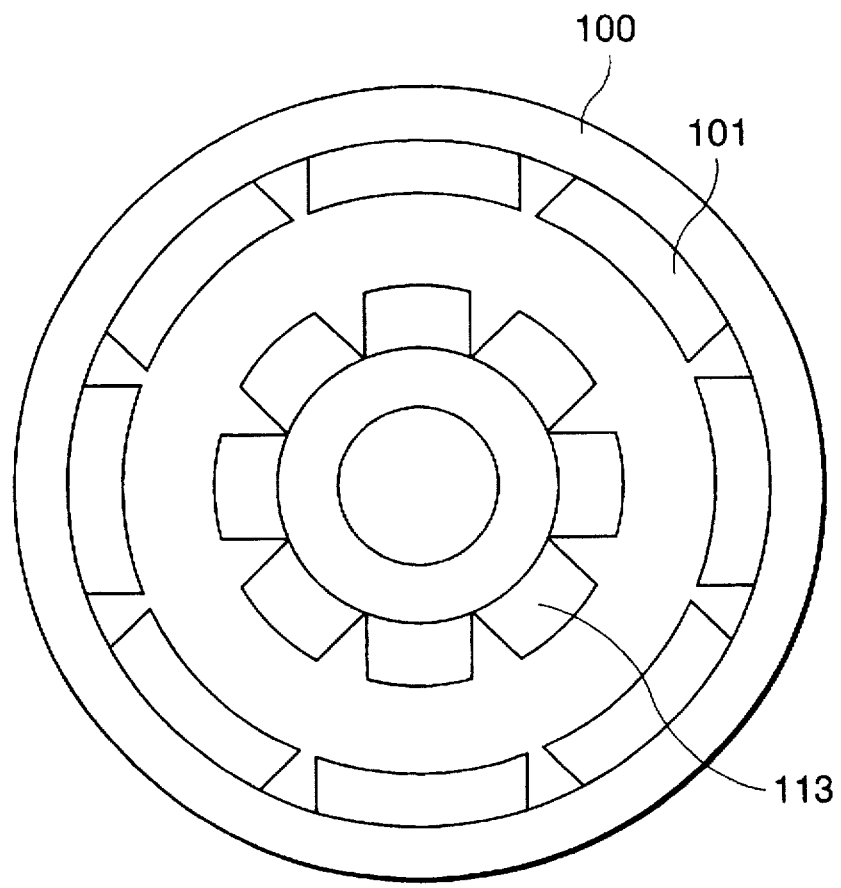
FIG. 4 is a horizontal cross-sectional view showing the phase relationship between the first and second magnets of the third embodiment of this invention in an unloaded state.

A cross-sectional view of the positional relationship between the first and second magnets in a non-loaded state is shown in FIG. 4. This is a stable state in which the respective widthwise centers of the outer magnet 101 and an inner magnet 113 are substantially matched by the forces of attraction and repulsion of these magnets.

Figure 5:
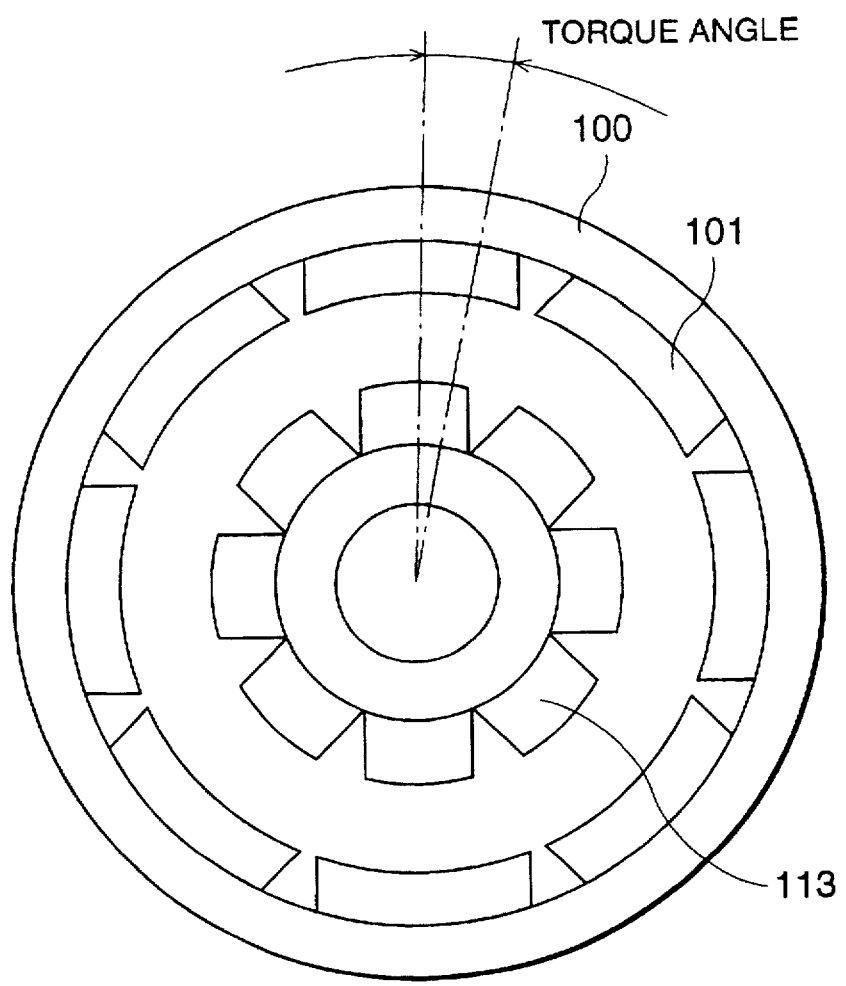
FIG. 5 is a horizontal cross-sectional view showing the phase relationship between the first and second magnets of the third embodiment of this invention in a loaded state.

Conversely, a state shown in FIG. 5 it the most stable state that occurs when the first and second magnets are loaded and rotate relative to one another from the positional relationship shown in FIG. 4 until the load and magnetic force reach a balanced state. This relative angle, which is determined by the load, is called the torque angle. This changes the peripheral distribution of the magnetic field within the gap between the outer magnet 101 and the inner magnet 113, depending on the load, so that the distorted waveform B of FIG. 3 is observed.

Therefore, the load torque applied to the magnetic coupling, that is, the load torque applied to the ball screw of the elevator apparatus, can be inferred by detecting this distortion in the waveform, particularly the distortion in the symmetry thereof. One method of evaluating this symmetry that has been considered is to perform time quadrature with respect to the voltage waveforms on either side of the axis 112, and calculate the area between that and the zero-voltage axis, and compare them. During this time, the accuracy with which the load torque is detected can be increased by weighting the voltages appropriately for the integration, even for small asymmetries.

This load torque is related to friction in the components, such as rotational friction caused by rubbing of the ball screw and friction between the control rod and the fuel. Evaluating this makes it possible to diagnose whether or not there is any abnormality such as strain or settling in the elevator apparatus for the control rod drive mechanism, the fuel, or the control rod without shuting down the unclear reactor.

Figure 6:
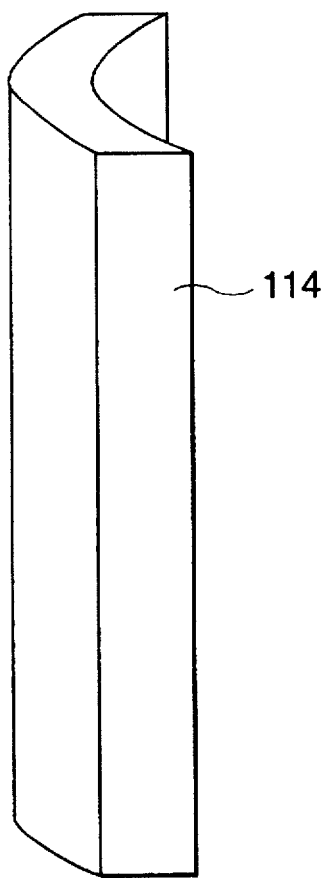
FIG. 6 is a structural view of part of a fourth embodiment of a control rod drive mechanism in accordance with this invention.

A fourth embodiment of a control rod drive mechanism in accordance with this invention will now be described with reference to FIG. 6. A magnet 114 shown in FIG. 6 is either an inner magnet or an outer magnet. The surface of the magnet is processed to coat a material such as a plastic or plating thereover. This makes it possible to give the magnet a certain resistance to impact. In general, when a magnet is subjected to a shock, the magnetic force thereof may drop slightly. However, the magnets in accordance with this embodiment can be expected to maintain their integrity, even with respect to impact loads incurred by the control rod drive mechanism during a scram or earthquake loads. Furthermore, the inner magnets are ordinarily in water which is a corrosive atmosphere, but this coating isolates them from the water, making it possible to prevent corrosion.

A fifth embodiment of a control rod drive mechanism in accordance with this invention will now be described with reference to FIG. 7. This figure shows the outer rotor 107. Leaf springs 120, 121, and 122 are disposed between the outer magnet 101 and the outer yoke 100, outer sleeve 104, and magnet fixing members 102. This makes it possible to provide an impact-resistance effect that is similar to that of the coating of the fourth embodiment, and thus the magnets can be expected to maintain their integrity with respect to impact loads incurred by the control rod drive mechanism during a scram or from earthquake loads. Three types of leaf springs 120, 121, and 122 are provided to ensure that impacts in the axial, peripheral, and radial directions of the outer yoke 100. Note that this embodiment could be applied to the first magnet (inner magnet) in the same way.

It should also be noted that springs of other configurations, such as disc springs, can be used instead of leaf springs. Any thin material having an impact-resistance action, such as a sheet of rubber or plastic, would have a similar effect.

Figure 8:
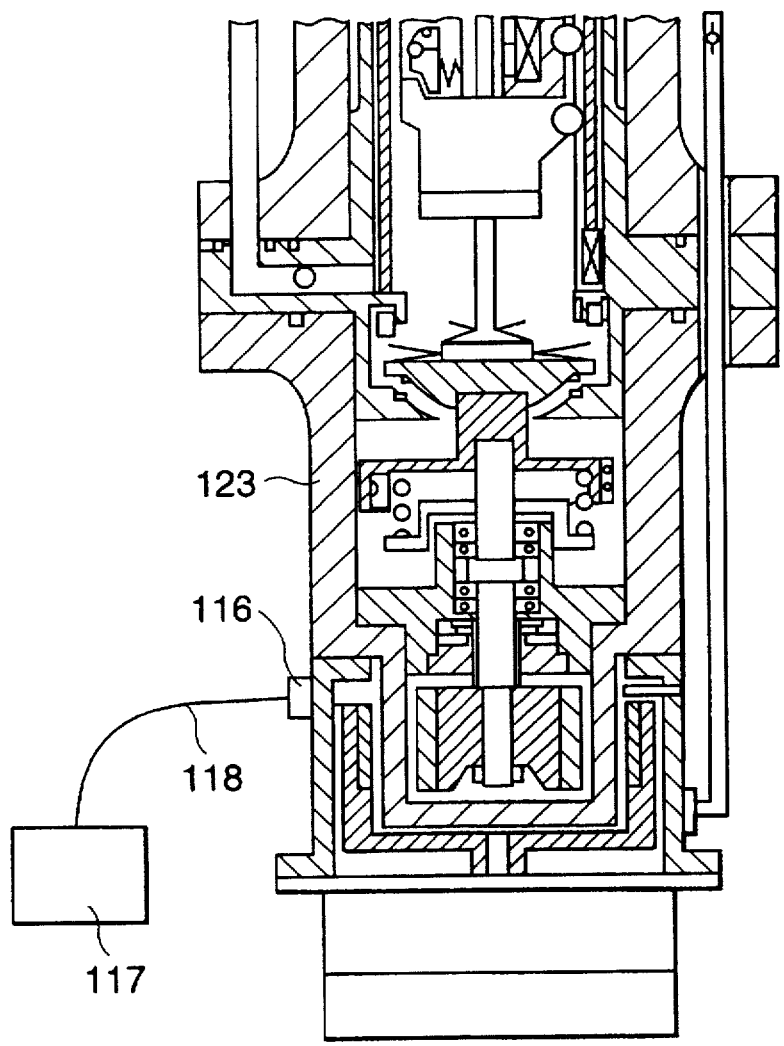
FIG. 8 is a vertical cross-sectional view through a sixth embodiment of a control rod drive mechanism of the present invention.

The description now turns to a sixth embodiment of a control rod drive mechanism in accordance with this invention, with reference to FIG. 8. This figure is a cross-sectional view of a portion corresponding to the spool piece 56 of FIG. 24. A magnetic sensor 116 is installed on an outer peripheral portion of a motor bracket 123 and a signal line 118 therefor is connected to a signal processor 117. The magnetic sensor 116 could be an overcurrent displacement gage or a Hall-effect element, or it could be a simpler device such as a conductive wire, film, sheet, or coil that generates an induction voltage with changes in magnetic field.

In general, the magnetic coupling is formed of a closed magnetic circuit configured by the first magnet, the second magnet, the yoke, and the space between the magnets. Therefore, there is substantially no leakage of magnetic flux to the outside, but there is a comparatively large leakage of magnetic flux in the vicinity of the edges of the magnets. The magnitude of this leakage flux increases with the magnitude of the magnetic force of the magnets, in other words, the residual magnetic flux density. In this embodiment, the magnetic sensor 116 is disposed in the vicinity of these edges where the leakage flux density is comparatively large, to measure the magnetic force of these magnets. This measurement can be done easily while the nuclear reactor is operating so that the degree to which the magnetic force is deteriorating can be determined without disassembling and inspecting the magnetic coupling.

The magnetic field that creates the leakage flux varies with time as the magnetic coupling rotates. When slipping occurs in a magnetic coupling, the first and second magnets generally rotate relative to one another in an unregulated manner, so that the variations with time in their magnetic field differ from those that occur when they are rotating in synchronism. Thus, if the output waveform of the magnetic sensor 116 could be analyzed by a signal processing apparatus that can separate components of different frequencies from the output waveform, the presence of slipping can be determined.

The peripheral-direction component of the magnetic field in the vicinity of the edges of the magnets also varies during synchronous rotation because the torque angle of the first and second magnets varies with the magnitude of the load torque. Thus the load torque applied to the ball screw of the elevator apparatus can be inferred by detecting variations in the waveform of the magnetic sensor 116. Methods similar to those of the third embodiment can be used to detect these waveform variations. Note that, since the magnetic sensor 116 is mounted on the outside of the motor bracket 123, it can be attached and removed without affecting the motor (not shown in the figure) and the motor bracket 123. This facilitates replacement of the magnetic sensor 116 if it should become damaged or deteriorated.

Figure 9:
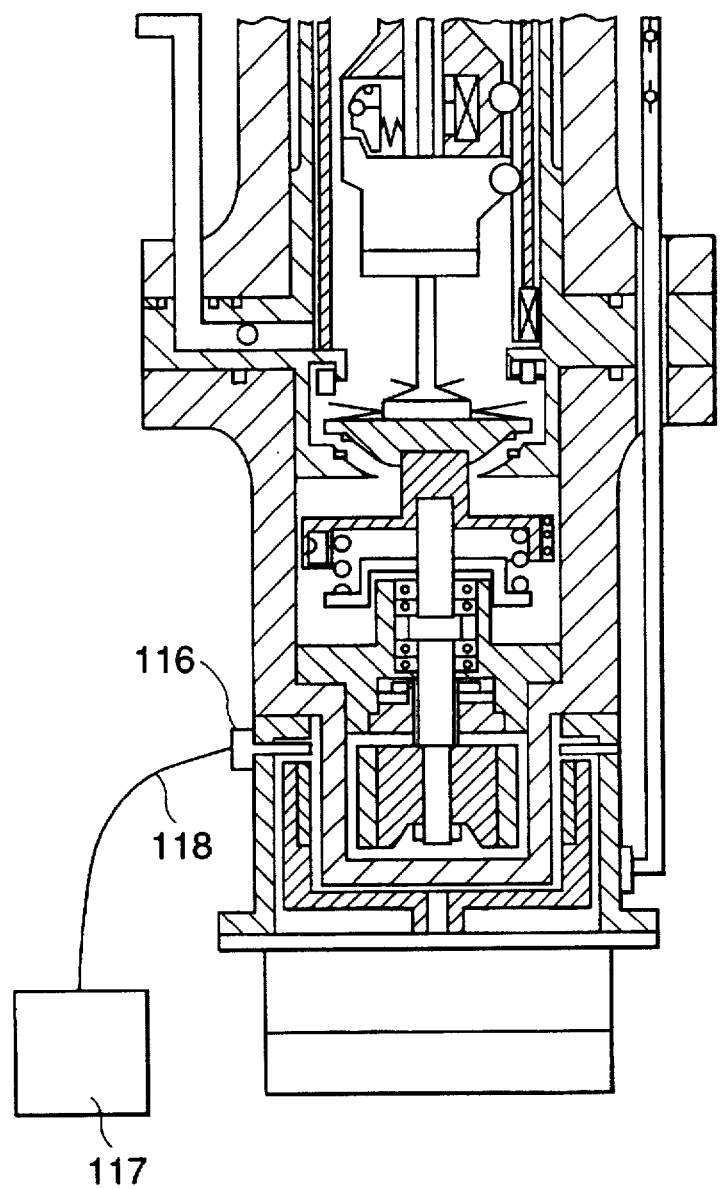
FIG. 9 is a vertical cross-sectional view through a seventh embodiment of a control rod drive mechanism of the present invention.

A seventh embodiment of a control rod drive mechanism of the present invention will now be described with reference to FIG. 9. In this case, the magnetic sensor 116 is mounted within the motor bracket 123. This embodiment makes it possible to measure at a portion that is close to the magnetic coupling, enabling an increase in sensitivity. Note that this magnetic sensor 116 is fixed by a method that enables it to be inserted and removed from outside the motor bracket 123, so it is easy to replace the magnetic sensor 116 if it should become damaged or deteriorated.

Figure 10:
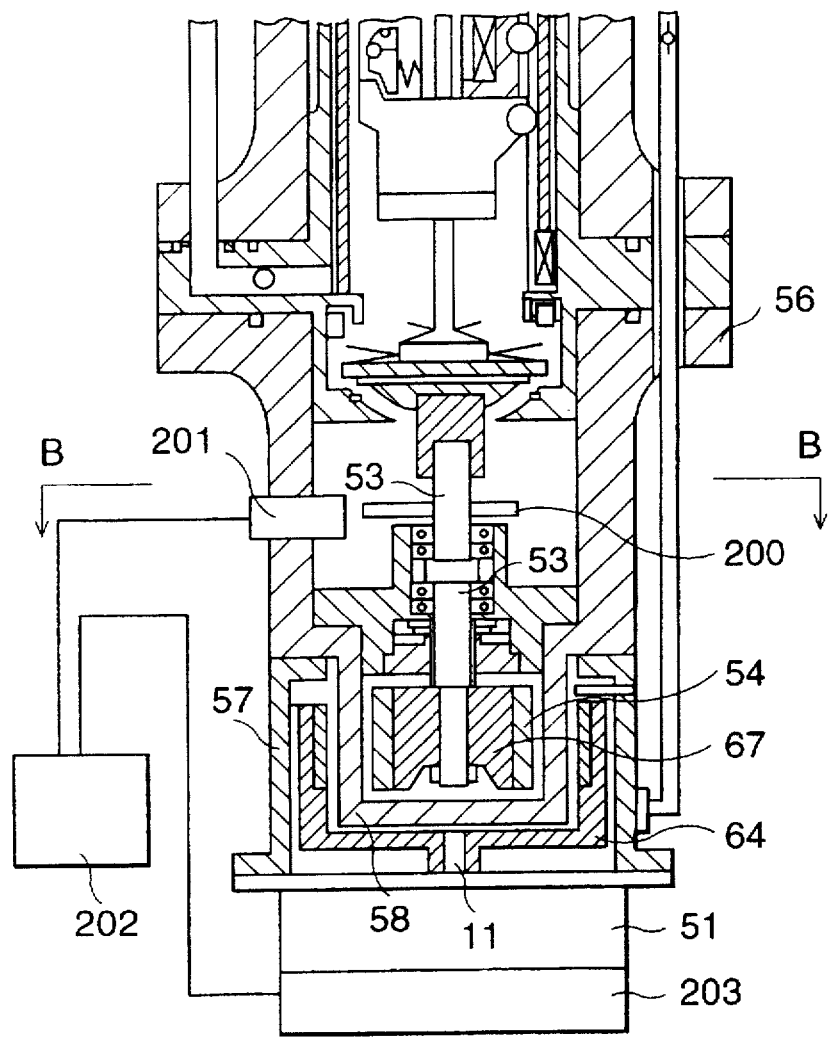
FIG. 10(a) is a vertical cross-sectional view through an eighth embodiment of a control rod drive mechanism of the present invention and FIG. 10(b) is a section taken along the line B—B of FIG. 7(a)
Figure 10:
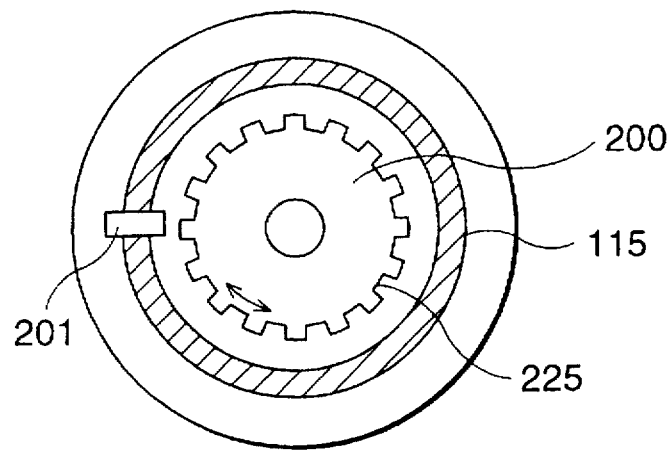
Figure 24:
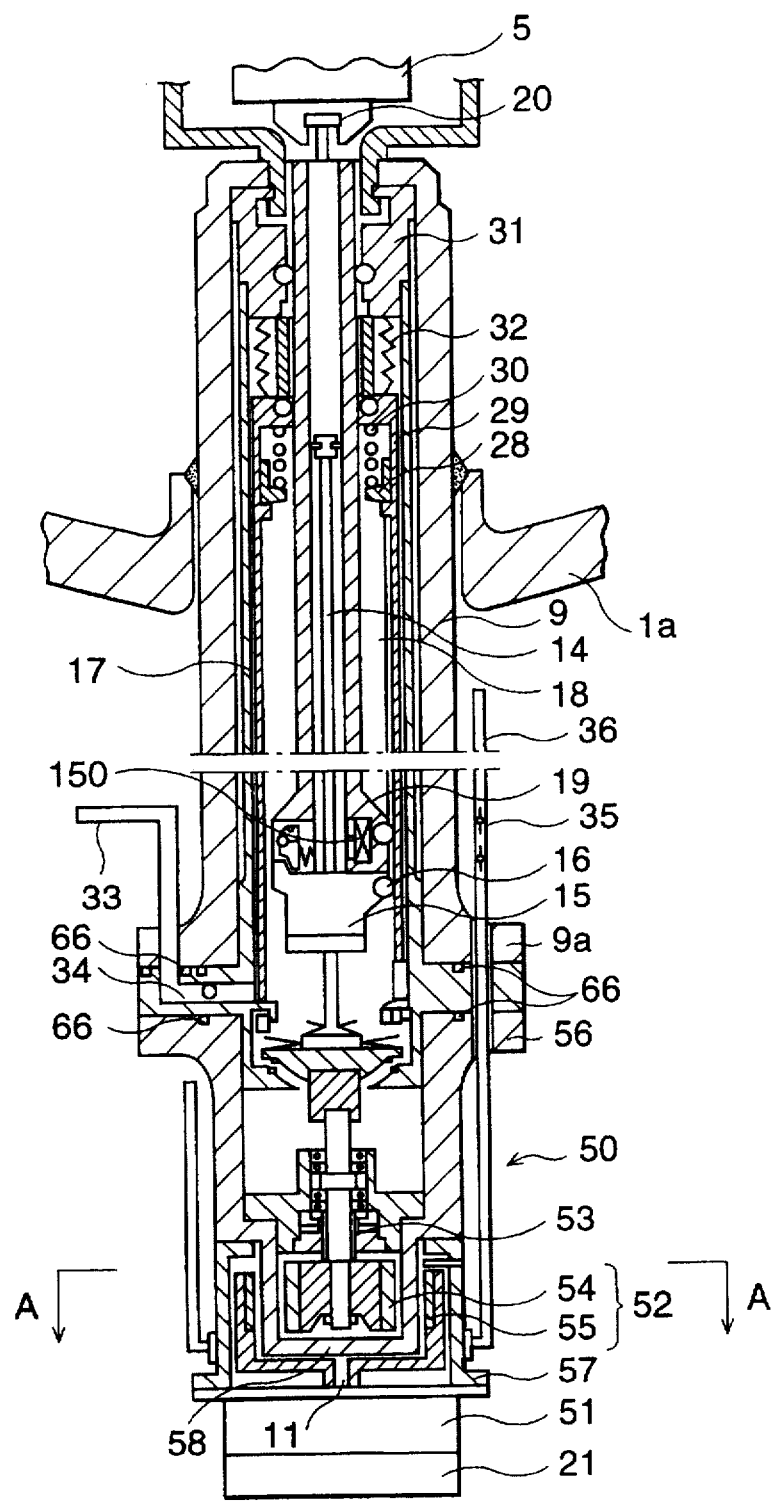
FIG. 24 is a vertical cross-sectional view of another prior-art example of a control rod drive mechanism.
Figure 25:
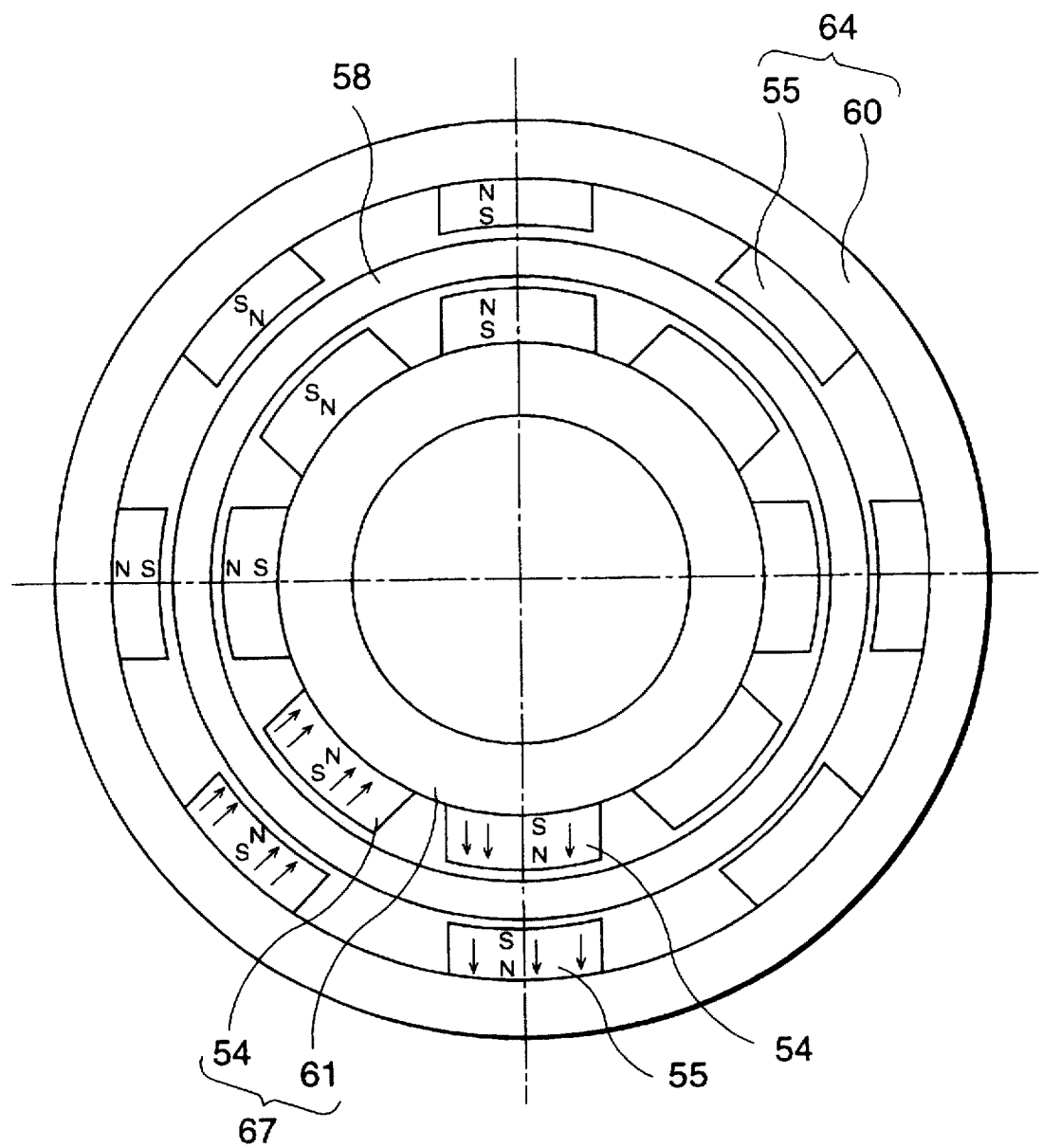
FIG. 25 is a horizontal cross-sectional view for illustrating the drive principle of the magnetic control rod drive mechanism.
Figure 26:
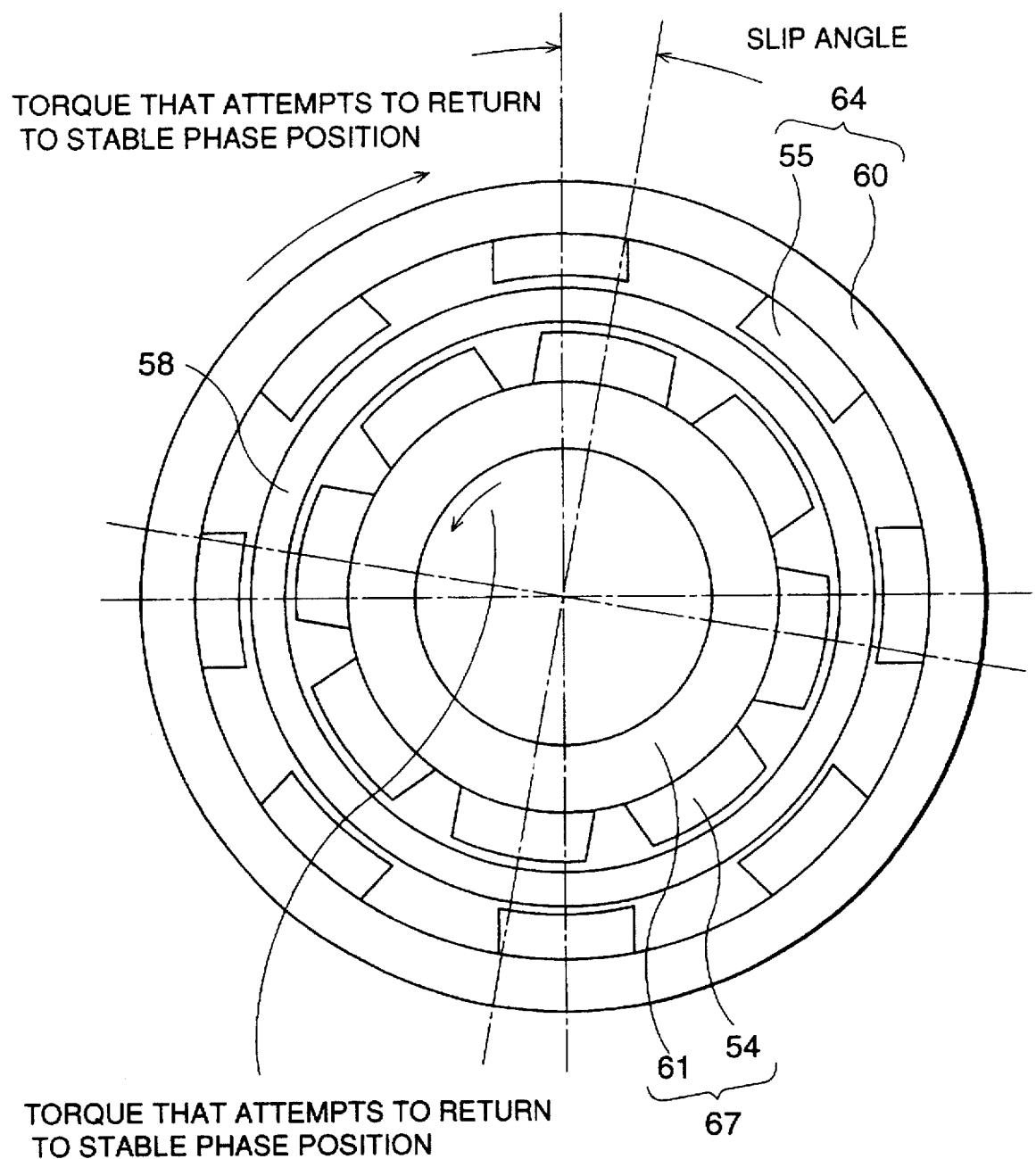
FIG. 26 is another horizontal cross-sectional view for illustrating the drive principle of the magnetic control rod drive mechanism.
Figure 27:
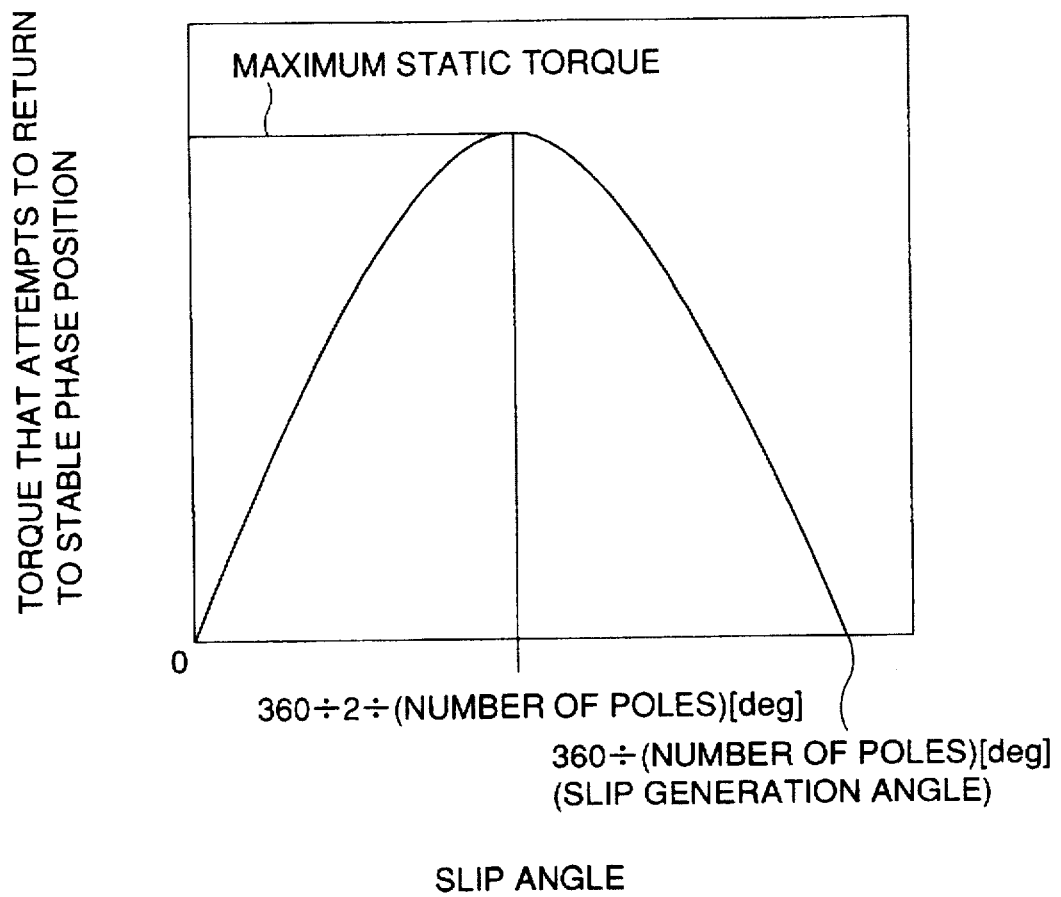
FIG. 27 is a conceptual view of the relationship between displacement angle and torque in the magnetic coupling.

An eighth embodiment of a control rod drive mechanism of the present invention (corresponding to claims 16 to 18 of this specification) will now be described with reference to FIGS. 10(a) and 10(b). FIG. 10(b) is a cross-sectional view taken along the line A—A of FIG. 10(a). Portions in these figures that are the same as those in FIG. 24 are denoted by the same reference numbers and detailed descriptions of these components are omitted.

In this embodiment of the invention, a flat, circular rotation member 200 that is linked to the inner rotor 67 is provided to detect the rotation of the inner magnet 54 that rotates together with the inner rotor 67.

This rotation member is provided within the spool piece 56 so that it is arranged within a pressure boundary that is a pressure barrier for the primary coolant of the reactor. Indentations are formed in the surface of the rotation member 200. With this embodiment, a large number of grooves 225 are provided in a regular pattern on a side surface of the rotation member 200. A displacement measurement apparatus 201 is disposed on a side surface of the spool piece 56 to act as a rotation detection means for measuring and outputting the distance to the indentations that are formed to provide the large number of grooves 225 in the surface of the rotation member 200.

Examples of the measurement apparatus that could be used as this displacement measurement apparatus 201 include an overcurrent displacement gage capable of measuring the distance to a conductor or a laser displacement gage capable of shining a laser onto a target surface and measuring the time taken for that light to return. An output from the displacement measurement apparatus 201 is transferred through a signal line to a signal processing system 202 that also functions as an electronic counter. The distance between the displacement measurement apparatus 201 and the side surface of the rotation member 200 varies periodically with the rotation of the inner rotor 67, and thus an output synchronized with this rotation is obtained from the displacement measurement apparatus 201. The angle through which the inner rotor 67 has rotated can be determined by using the signal processing system 202 to count the period of variations in this output. The rotational speed can be obtained from transitions in the rotational angle with time.

Similarly, the rotational position of the outer rotor 64 can be measured by a rotational position detector 203 that is a means for detecting the rotation of the shaft of the electric motor 51. An example of the rotational position detector 203 that could be used is the synchro position detector for a control rod drive mechanism of the prior art. An output of the rotational position detector 203 is transferred to the signal processing system 202 through a signal line. This signal processing system 202 is an output processing means that compares the outputs of the rotational position detector 203 and displacement measurement apparatus 201, and it is capable of comparing the rotational angle or rotational speed of the inner rotor 67 and the outer rotor 64.

If there is no slipping in the magnetic coupling, the discrepancy between the rotational position of the inner rotor 67 and the rotational position of the outer rotor 64 is within the range of a slip generation angle. Therefore, the occurrence of slipping can be detected by using the displacement measurement apparatus 201, rotational position detector 203, and the signal processing system 202.

Figure 11:
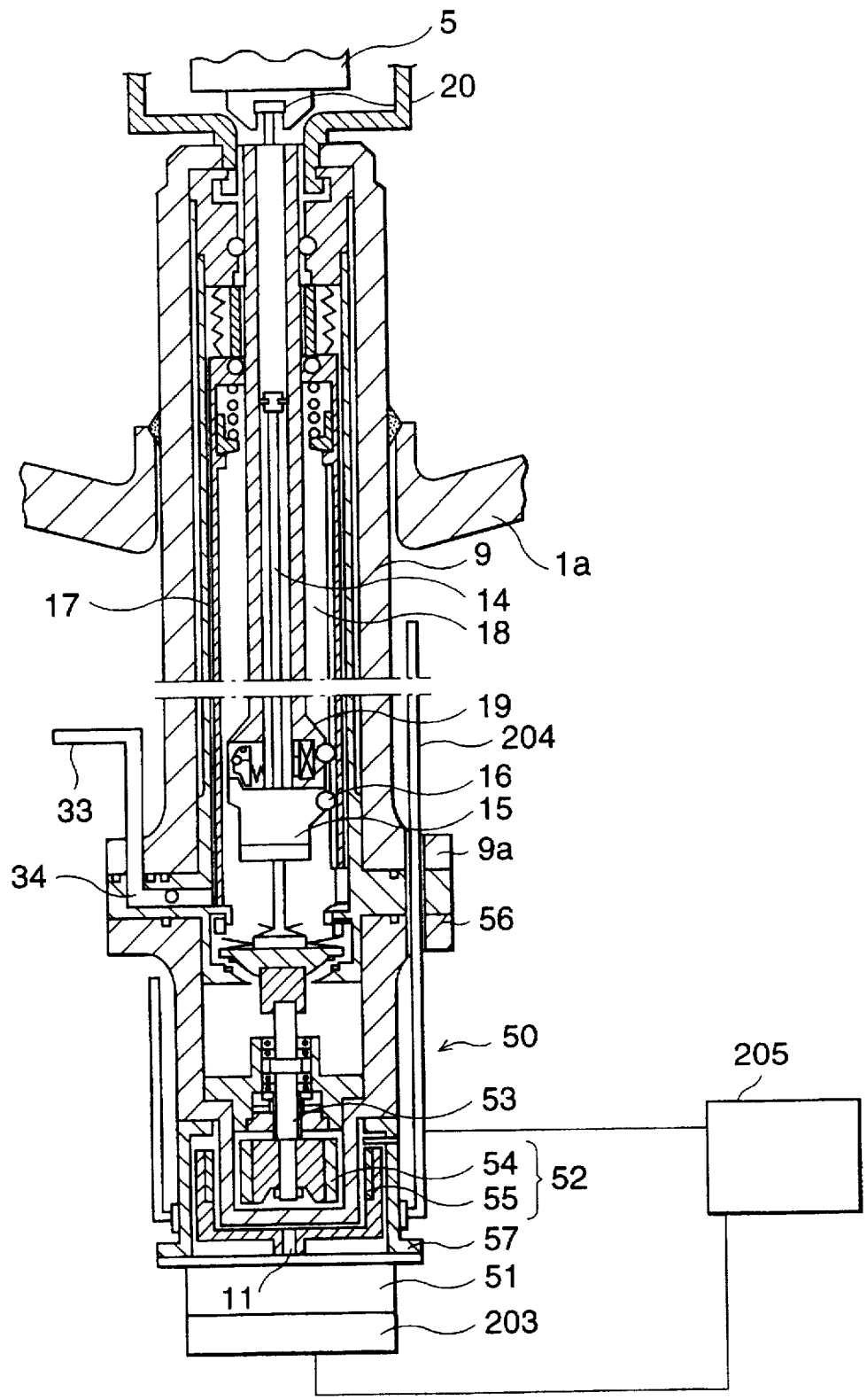
FIG. 11 is a vertical cross-sectional view through a ninth embodiment of a control rod drive mechanism of the present invention.

A ninth embodiment of a control rod drive mechanism of the present invention (corresponding to claim 19 of this specification) will now be described with reference to FIG. 11.

This embodiment is characterized in being provided with a control rod position detection apparatus 204 acting as means for detecting the vertical position of the control rod, together with a signal processing system 205 for comparing outputs from this control rod position detection apparatus 204 and the rotational position detector 203. The principle behind the detection of the vertical position of the control rod is the same as that of the scram position detector 36 of the prior-art control rod drive mechanism. Alternatively, a magnetostrictive sensor that is capable of continuously detecting the position of a magnet by making use of the magnetostriction phenomenon could also be used to detect a magnet provided in the hollow piston 19. In this embodiment, the control rod position detection apparatus 204 is disposed on the outside of the CRD housing 9, but this is not limiting; it could equally well be disposed within the control rod drive mechanism 50. If no slipping of the magnetic coupling has occurred, there is only a very small discrepancy, within the range of the slip generation angle, between the control rod position obtained from the rotational position detector 203 and the vertical control rod position detected by the control rod position detection apparatus 204. Therefore, the occurrence of slipping can be determined by the signal processing system 205 comparing these two outputs.

A tenth embodiment of a control rod drive mechanism of the present invention (corresponding to claim 20 of this specification) will now be described with reference to FIG. 12. In this embodiment, there are no changes to the control rod drive mechanism 50 and spool piece 56 of FIG. 24 so only the related electrical portions are shown. Electrical power from a power source 207 is supplied to an electric motor 206, and the waveforms of the voltage and current thereof are measured by a waveform processing system 208. Various types of AC motor could be considered as the electric motor 206, such as the stepping motor of the prior-art control rod drive mechanism, an induction motor, or a synchronous electric motor. However, such electric motors generally have a problem in that the magnitude of the current and the phase difference of the voltage and current waveforms vary with the magnitude of the load power, or rather the load torque. That is why this current and phase difference are detected by providing the waveform processing system 208 between the electric motor 206 and its power source 207, and the load torque is inferred therefrom.

The phase can be detected comparatively easily by a method such as one in which the waveform is converted from analog to digital form and fetched into a computer for numerical processing.

Figure 13A:
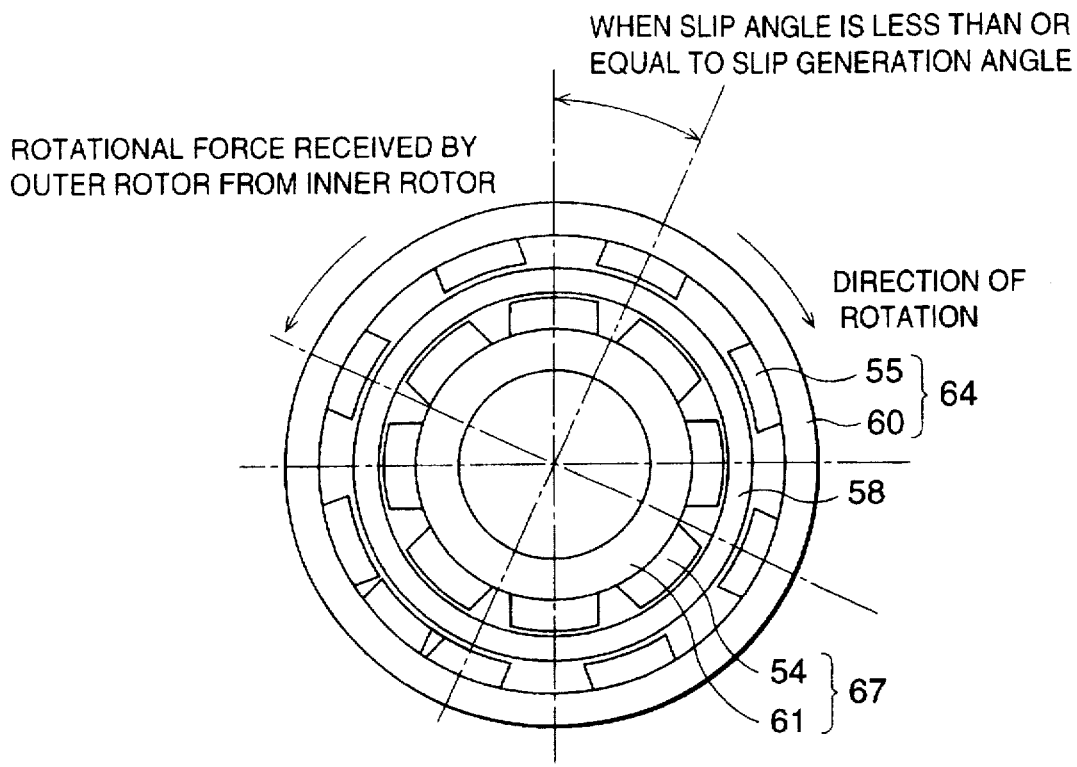
FIGS. 13(a) and 13(b) are both conceptual diagrams for illustrating the physical phenomena that occur when slipping occurs in the magnetic coupling.
Figure 13B:
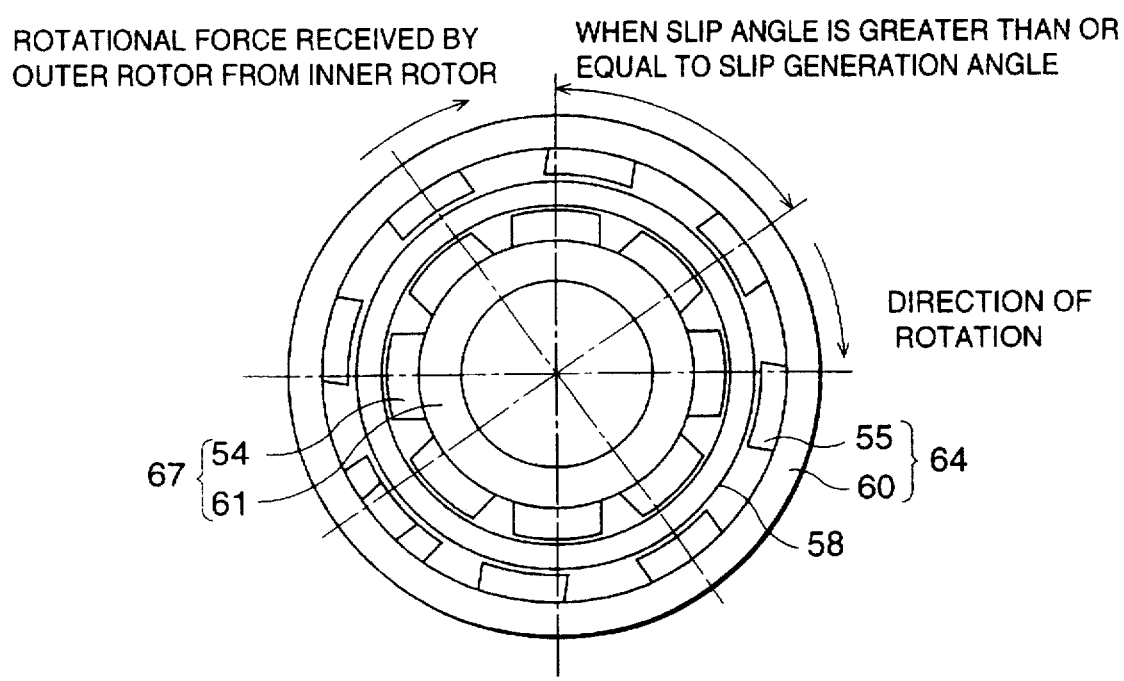
Figure 14:
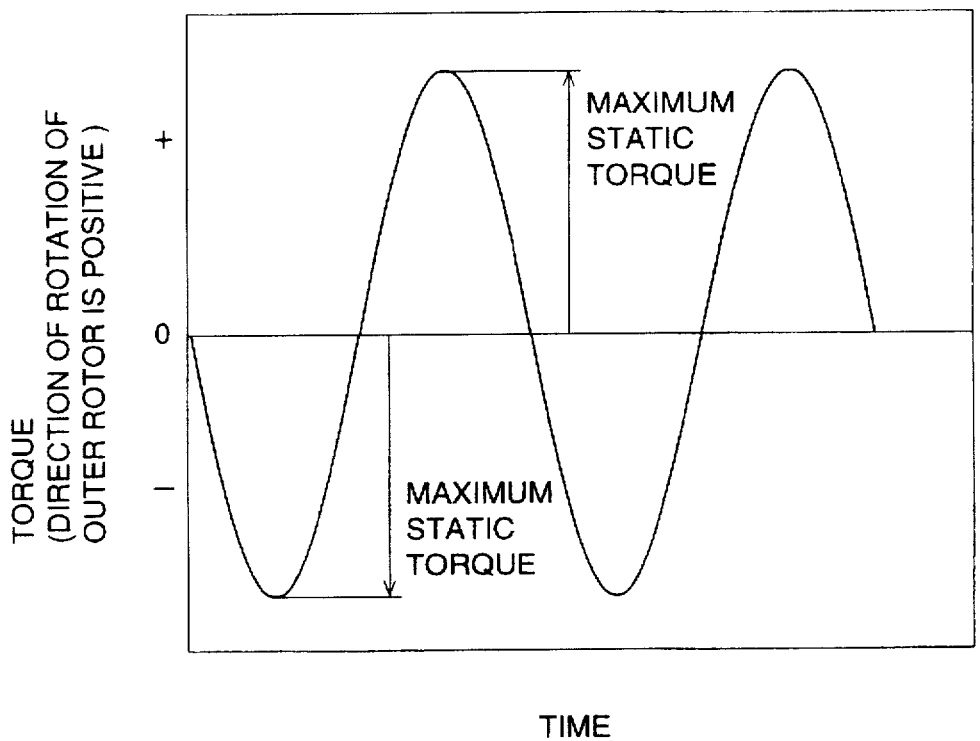
FIG. 14 is another conceptual diagram for illustrating the physical phenomena that occur when slipping occurs in the magnetic coupling.

The physical phenomena that occur in the magnetic coupling when slipping occurs will now be discussed, using horizontal cross-sections through the magnetic coupling shown in FIG. 13. Consider a case in which the inner rotor 67 becomes unable to rotate while the electric motor 206 of FIG. 12 is operating, for some reason such as damage to the ball screw shaft 14, as an example of the occurrence of slippage. If the torque of the electric motor 206 is greater than the maximum static frictional torque of the magnetic coupling, the outer rotor 64 will continue to rotate and thus slipping will occur. If the displacement angle is less than the slip generation angle, the outer rotor 64 is subjected to a torque due to the action of the magnetic force from the inner rotor 67 in the direction shown in FIG. 13(a). If this occurs while the motor is operating, this torque is transferred as load torque to the motor and is then transferred to the electromagnetic brake 21 if the control rod is held at its fixed position. If the outer rotor 64 rotates further and the displacement angle exceeds the slip generation angle, the direction of the torque that it receives reverses as shown in FIG. 13(b). If the slipping continues to occur, the torque is observed to reverse in opposite directions. This is shown schematically in FIG. 14. The generated torque has a maximum value that is of the same order as the maximum static torque and the slip generation angle inverts symmetrically in the positive and negative directions.

Figure 12:
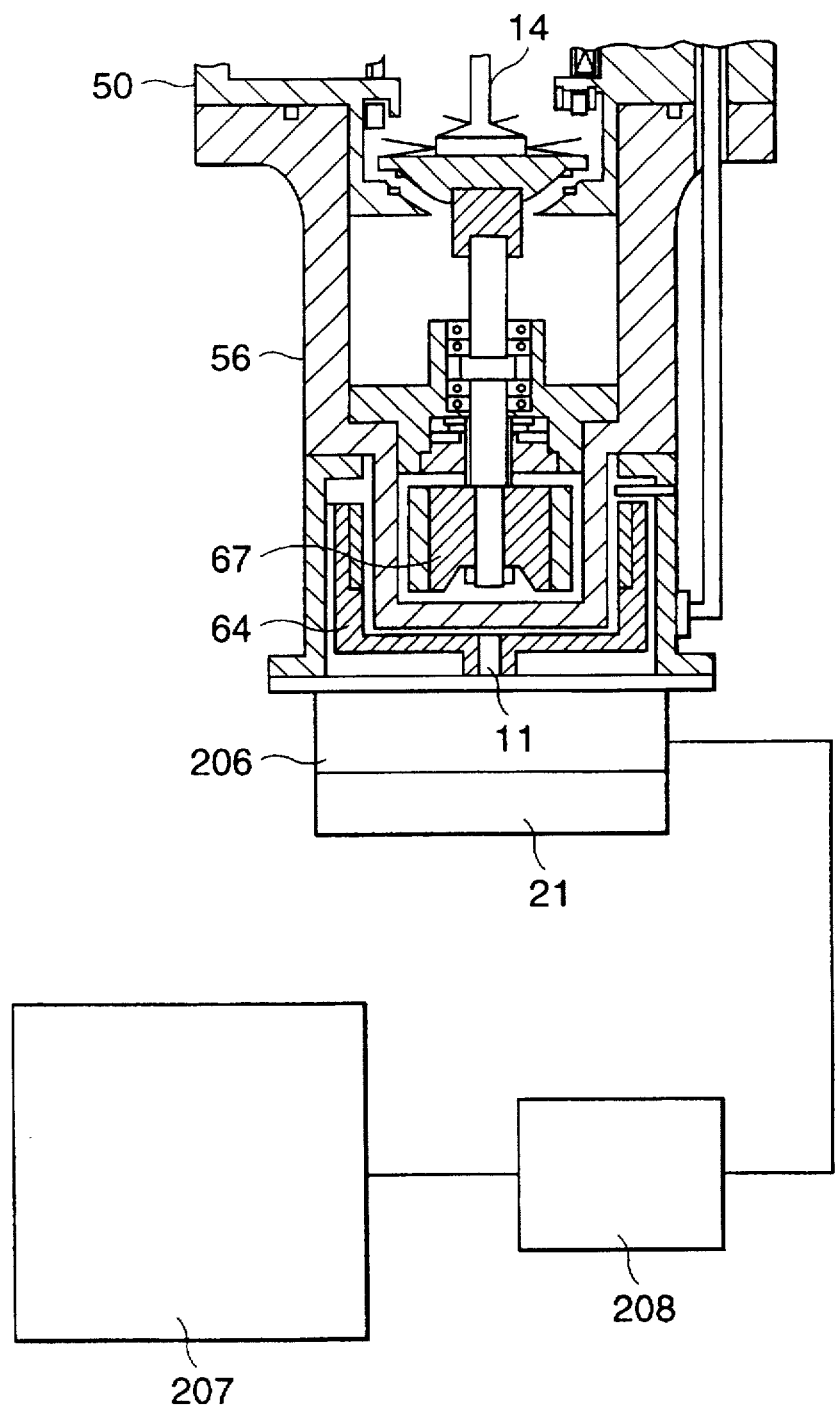
FIG. 12 is a vertical cross-sectional view through a tenth embodiment of a control rod drive mechanism of the present invention.

The linkage between the outer rotor 64 and the rotary shaft 11 of electric motor 206 in FIG. 12 facilitates disassembly and inspection of the electric motor 206 so that it provides a mechanical magnetic coupling that can be connected and disconnected easily to other components such as a gear coupling (not shown in the figure), but a coupling of this form usually tends to vibrate slightly in the direction of rotation. This vibration generates large impact torques in the coupling components during times such as when the direction of torque reverses, and these are transferred to the electric motor 206. Thus the load on the electric motor 206 comprises high-frequency torque components.

On the other hand, in the normal operating state in which there is no slipping, the rated load torque is designed to be sufficiently smaller than the maximum static torque so that none of the large torques that occur after slipping are applied to the electric motor 206, as described above.

This embodiment of the invention concentrates on the large torques generated after slipping occurs, of all the above-described physical phenomena, and, moreover, on the reversal of direction thereof. It is possible to detect slipping in the magnetic coupling generated while the motor is operating, by detecting the load toque of the electric motor caused by the phase difference between voltage and current of the motor, or changes in the current thereof.

Figure 15:
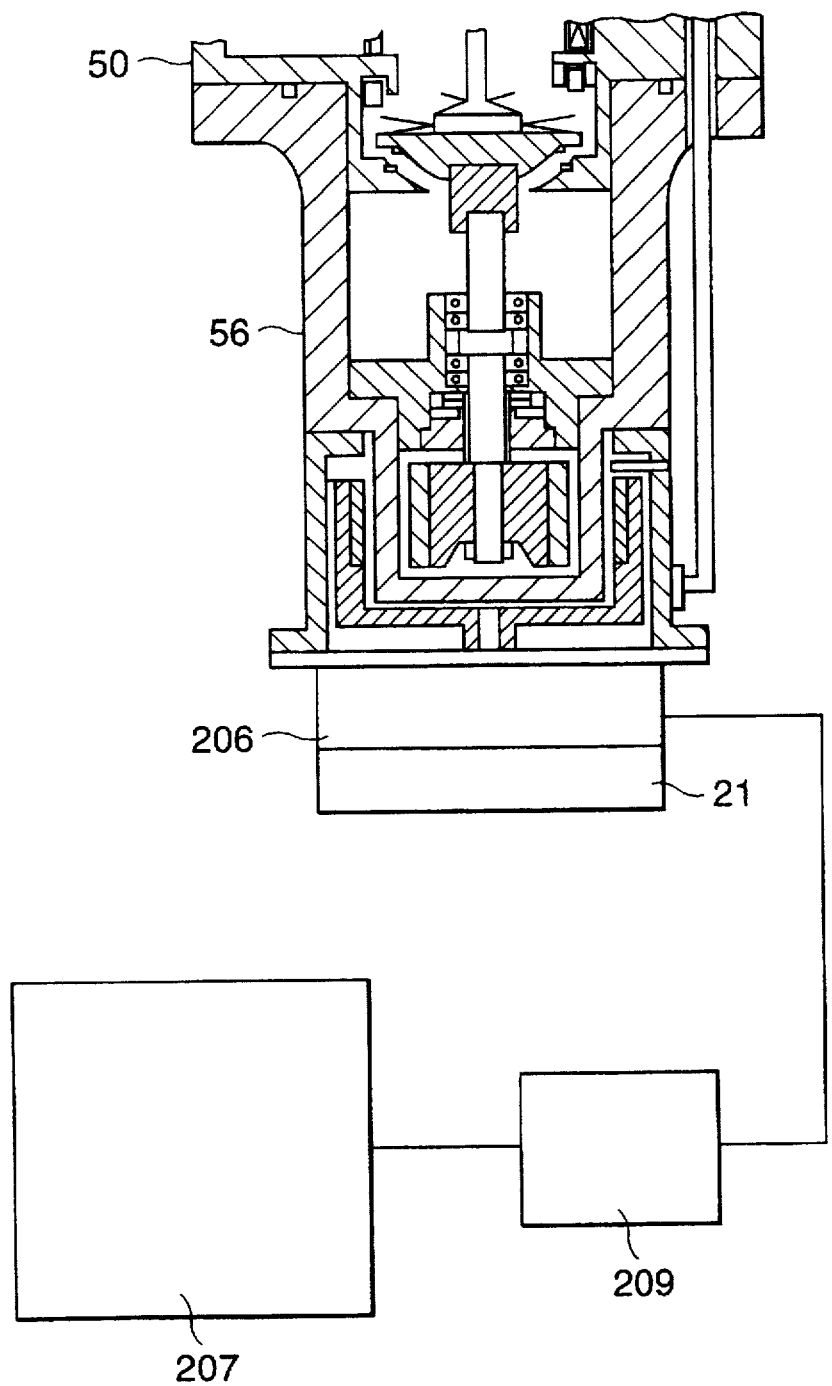
FIG. 15 is a vertical cross-sectional view through an eleventh embodiment of a control rod drive mechanism of the present invention.

An eleventh embodiment of a control rod drive mechanism of the present invention (corresponding to claims 21 and 22 of this specification) will now be described with reference to FIG. 15. Since there is no change in FIG. 15 to the control rod drive mechanism 50 and spool piece 56 of the tenth embodiment, only the components around the electric motor 206 are depicted in detail therein. The electrical power from the power source 207 is supplied to the electric motor 206 but the current and voltage waveforms thereof are subjected to frequency analysis by a frequency analysis system 209. In the same manner as in the tenth embodiment, this embodiment concentrates on the characteristic that, of all the above-described physical phenomena, high-frequency load torque components are generated in the electric motor 206. These load torques cause high-frequency components in the current and voltage waveforms that are not seen during normal operation, thus making it possible to detect the occurrence of slipping by frequency analysis thereof.

Figure 16:
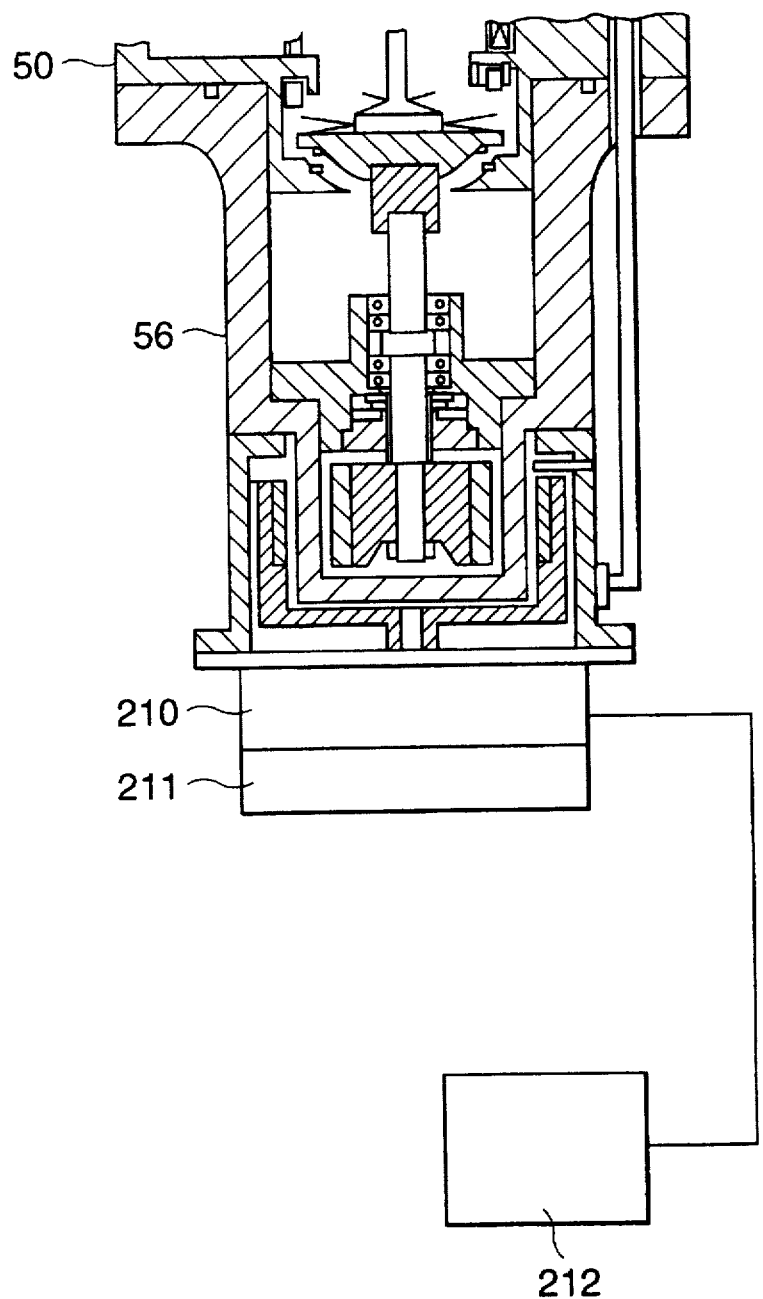
FIG. 16 is a vertical cross-sectional view through a twelfth embodiment of a control rod drive mechanism of the present invention.

The description now turns to a twelfth embodiment of a control rod drive mechanism of the present invention (corresponding to claim 15 of this specification), with reference to FIG. 16. In this embodiment, there are no changes to the control rod drive mechanism 50 and spool piece 56 of FIG. 15, so only the components around the electric motor are depicted. This embodiment uses an induction motor 210 as the electric motor. The rotational speed of this induction motor 210 can be detected by a rotational position detector 211 provided as a load torque detection means, with a data processing system 212 connected thereto. Any conventional detector for a control rod drive mechanism can be used as the rotational position detector 211, such as the synchro position detector 22.

In general, the rotational speed of an induction motor has a fixed relationship with the synchronous speed when the load is zero, determined by the frequency of the AC power source, and each motor has its own specific relationship which can be expressed in a graph by a curve called a torque-rotation characteristic. Therefore, the rotational position detector 211 measures the rotational speed of the induction motor and the load torque can be determined from the torque-rotation characteristic of this motor by using the data processing system 212.

Thus, as described previously in the section on the tenth embodiment, changes in the load toque after slipping occurs are detected as changes in the rotational speed of the motor, so that the occurrence of slipping can be detected thereby.

Figure 17:
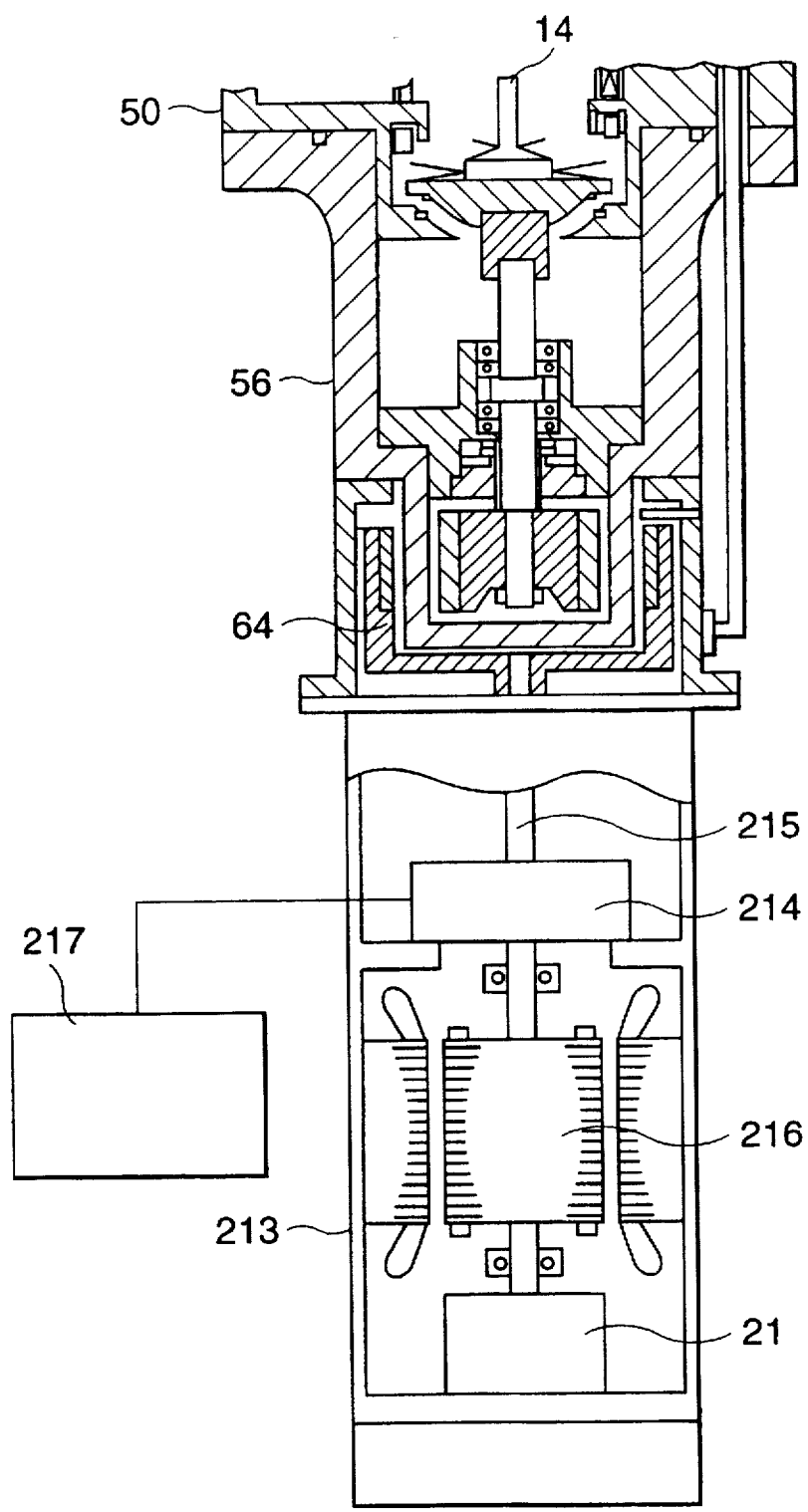
FIG. 17 is a vertical cross-sectional view through a thirteenth embodiment of a control rod drive mechanism of the present invention.

A thirteenth embodiment of a control rod drive mechanism of this invention (corresponding to claims 24 and 25 of this specification) will now be described with reference to FIG. 17. In this embodiment, there are no changes to the control rod drive mechanism 50 and spool piece 56 of FIG. 15, so only the components around an electric motor 213 are depicted. A torque detector 214 for detecting the torque of the electric motor 213 is provided in an intermediate portion between the outer rotor 64, which is connected to a rotary shaft 215 of the electric motor 213, and a rotor 216 of the electric motor 213. A strain-gage type of torque detector or a magnetostrictive type of torque detector could be used as the torque detector 214, and the torque can be detected when the rotary shaft 215 is static and when it is rotating. If the output waveform of this torque detector 214 is processed by a data processing system 217 and details of the magnitude and direction of the torque are analyzed, the torque after slipping occurs can be detected in the same manner as described above with reference to the tenth embodiment. Note that the electromagnetic brake 21 is provided at a lower portion of the rotor 216 of the electric motor 213.

Figure 18:
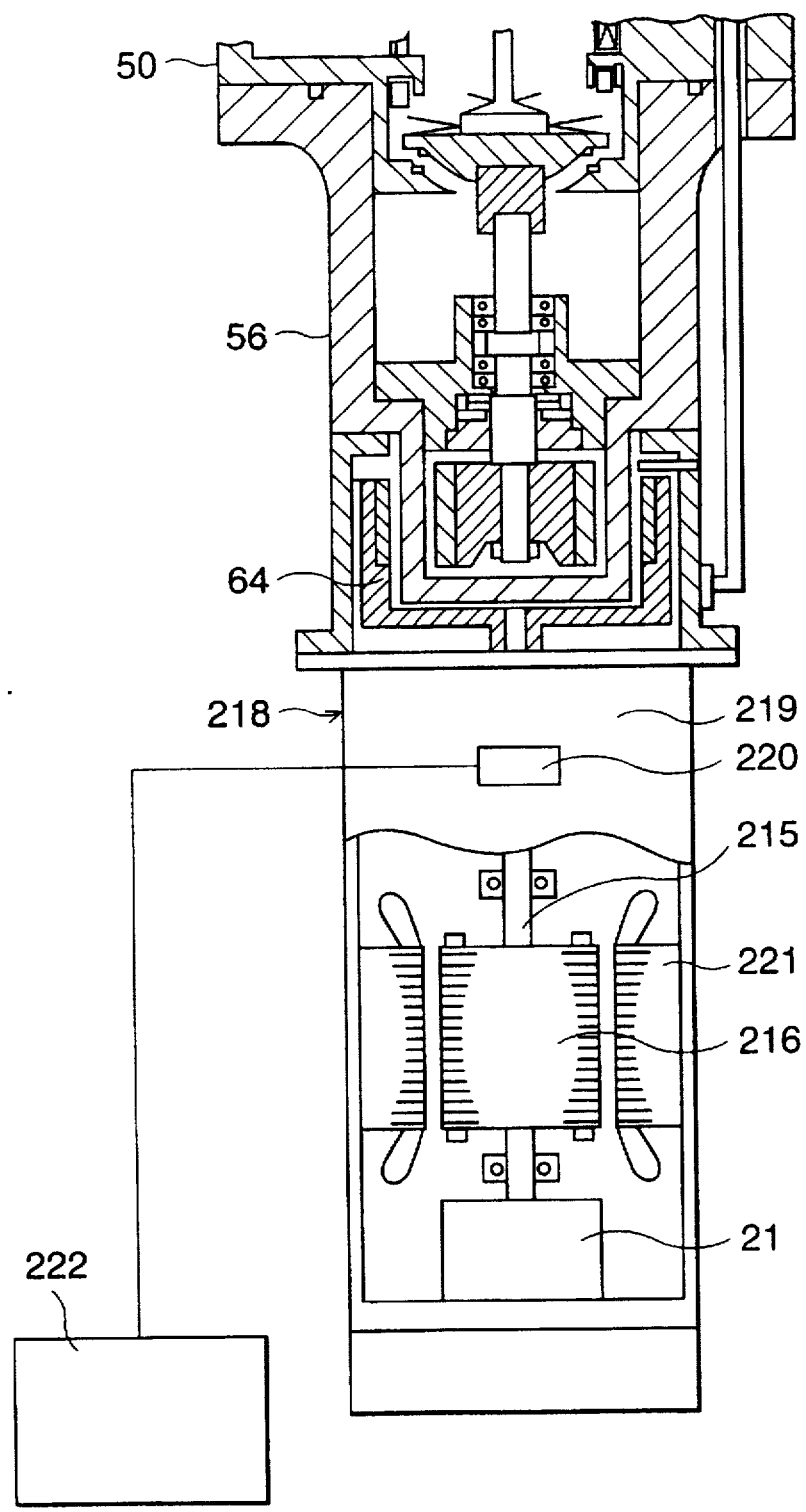
FIG. 18 is a vertical cross-sectional view through a fourteenth embodiment of a control rod drive mechanism of the present invention.

The description now turns to a fourteenth embodiment of a control rod drive mechanism of the present invention (corresponding to claims 26 and 27 of this specification), with reference to FIG. 18. In this embodiment too, there are no changes to the control rod drive mechanism 50 and spool piece 56 of FIG. 15, so only the components around an electric motor 218 are depicted. As described above in the section on the tenth embodiment, if slipping occurs when the electric motor 218 is operating, the torque generated in the magnetic coupling thereby is transferred from the rotor 216 to a stator 221. This stator 221, a motor housing 219 that is a member for fixing the stator 221 within the reactor pressure vessel 1, the spool piece 56, and also a CRD housing (not shown in the figures) are all subjected to torsion due to this torque.

When the control rod is held at its fixed position, torque is transferred from the rotary shaft 215 through the electromagnetic brake 21 to the motor housing 219, so that the electromagnetic brake 21, the motor housing 219, the spool piece 56, and the CRD housing are subjected to torsion.

The mechanism of the present invention is provided with means for detecting torsional strain in the above members, to detect torsional strain caused by torque after slipping occurs. An example of means for detecting torsion is shown in FIG. 18, wherein a strain detector 220 and a data processing system 222 for manipulating an output therefrom are provided in the motor housing 219. The way of installing the strain detector 220 is determined to ensure that the strain can be detected. Note that the installation position of the strain detector 220 is not limited to that shown in FIG. 18; it can be installed on any member where it is subjected to torsion caused by the torque caused by the occurrence of slipping.

Figure 19:
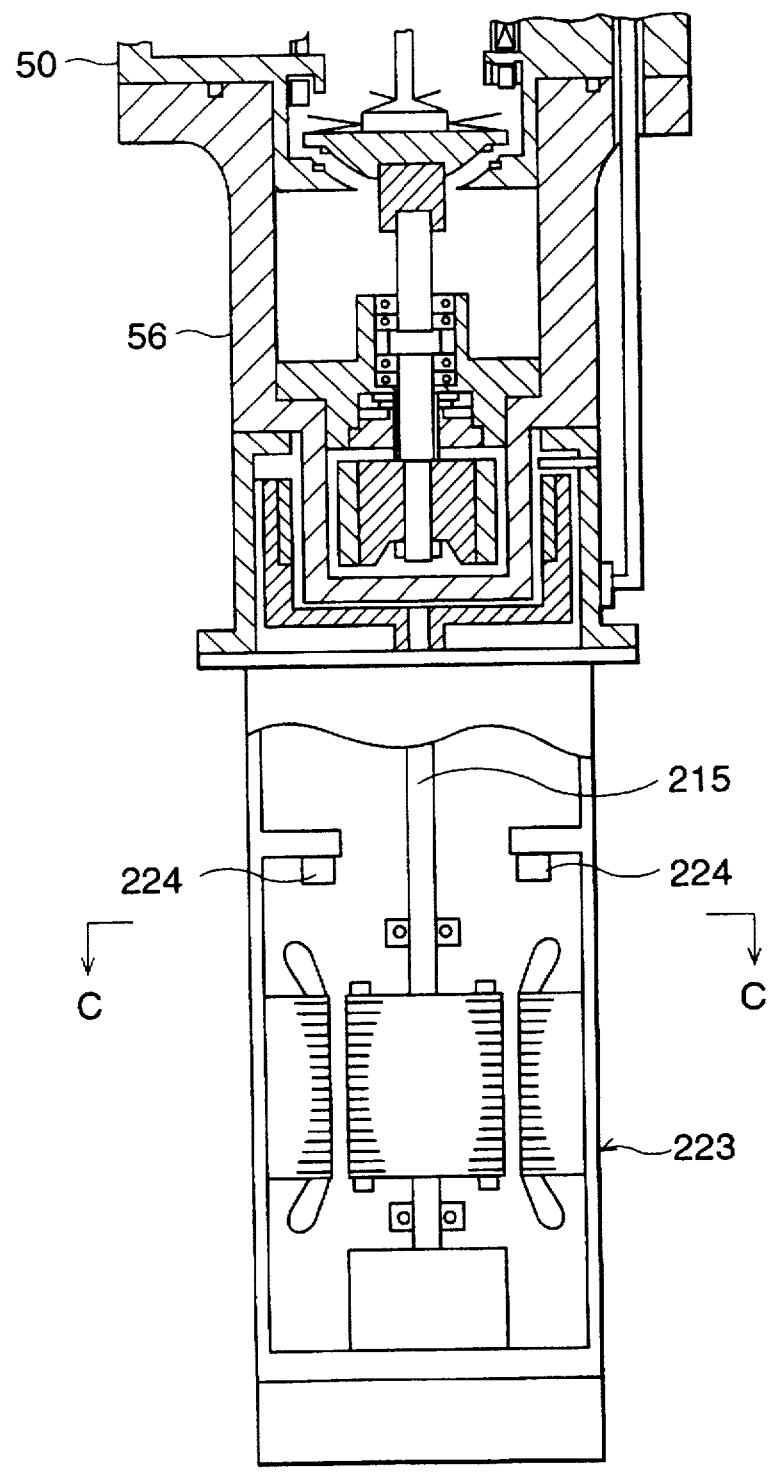
FIG. 19 is a vertical cross-sectional view through a fifteenth embodiment of a control rod drive mechanism of the present invention.
Figure 20:
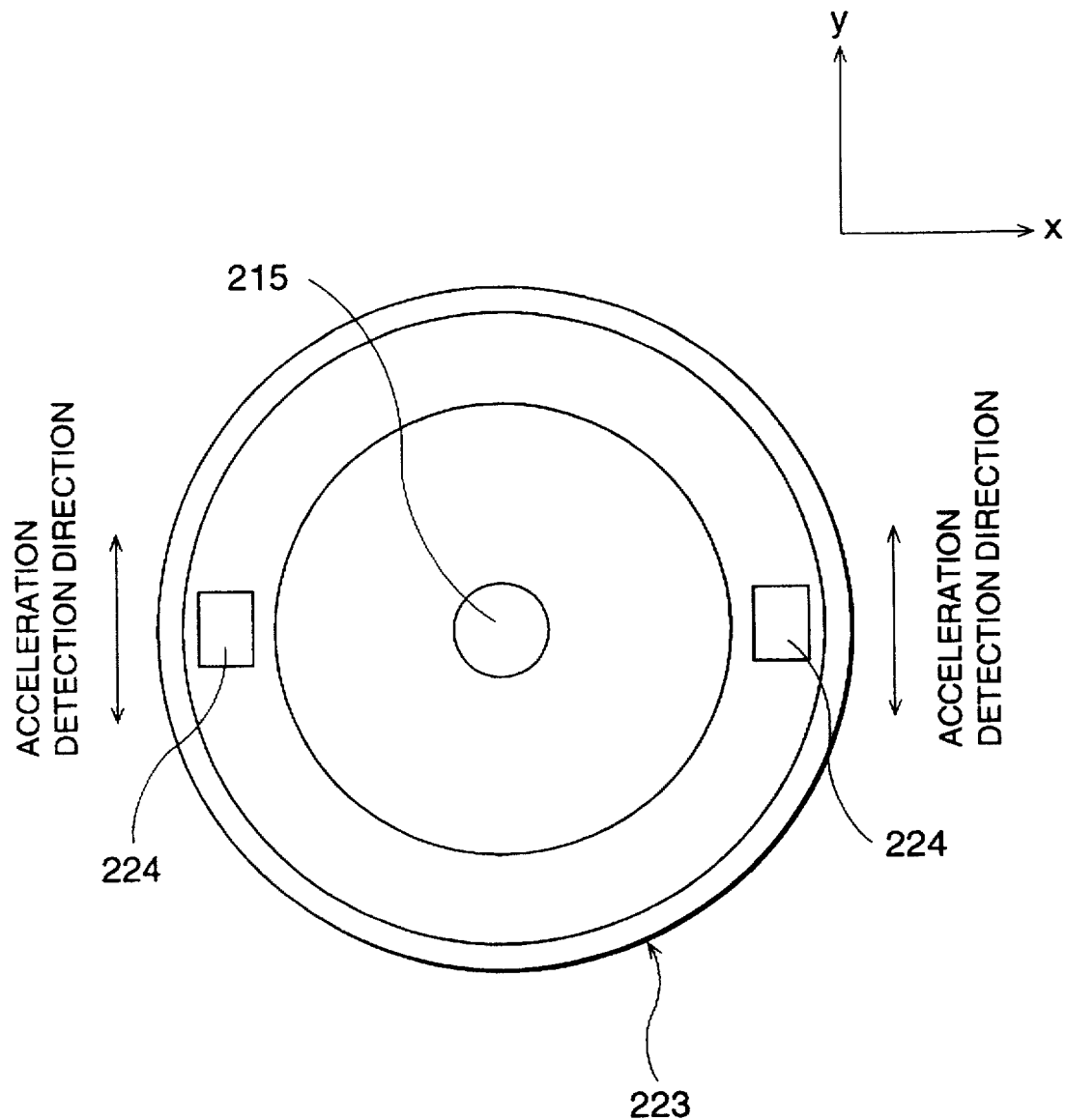
FIG. 20 is a conceptual diagram of the installation position of the acceleration sensor of the fifteenth embodiment of a control rod drive mechanism of the present invention.

A fifteenth embodiment of a control rod drive mechanism of this invention (corresponding to claims 28 and 29 of this specification) is shown in FIGS. 19 and 20. In this embodiment, there are no changes to the control rod drive mechanism 50 and spool piece 56 of FIG. 15, so only the components around an electric motor 223 are depicted. An acceleration sensor 224 for detecting acceleration in the peripheral direction of the electric motor 223 is installed in the electric motor 223. A section taken along the line A-A' of FIG. 19 is shown in FIG. 20. When torsional vibration is generated in the electric motor 223, the angular acceleration of that vibration can be measured by the acceleration sensor 224.

The torque generated after slipping causes torsion in the electric motor 223, but torque with high-frequency components caused by vibration of the mechanical coupling, particularly those due to the mechanical vibration of the coupling described in the section on the tenth embodiment, causes the generation of torsional vibration with a large angular acceleration. Slipping can be detected by detecting this vibration with the acceleration sensor 224.

Figure 21:
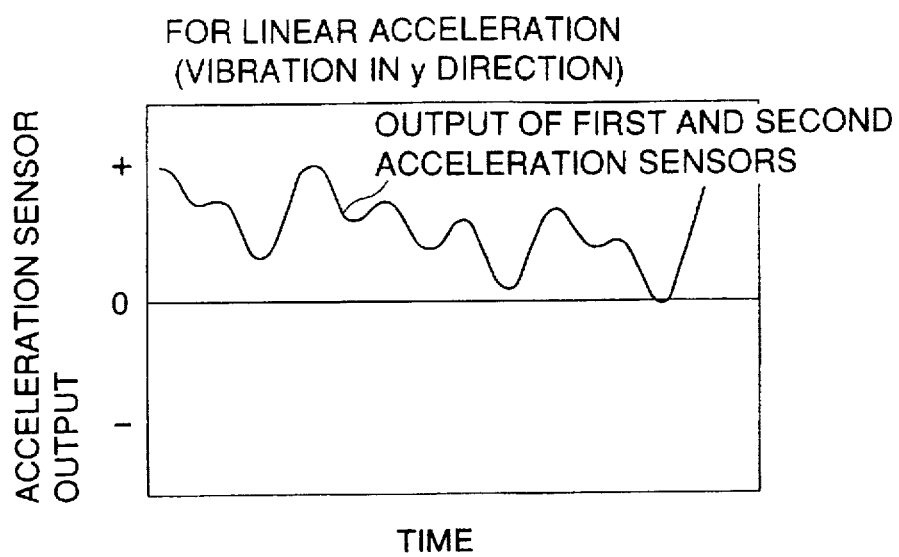
FIG. 21(a) is a conceptual diagram of an example of the linear acceleration output of the acceleration sensor of the fifteenth embodiment of a control rod drive mechanism of the present invention and FIG. 21(b) is a conceptual diagram of an example of the rotational acceleration output thereof.
Figure 21:
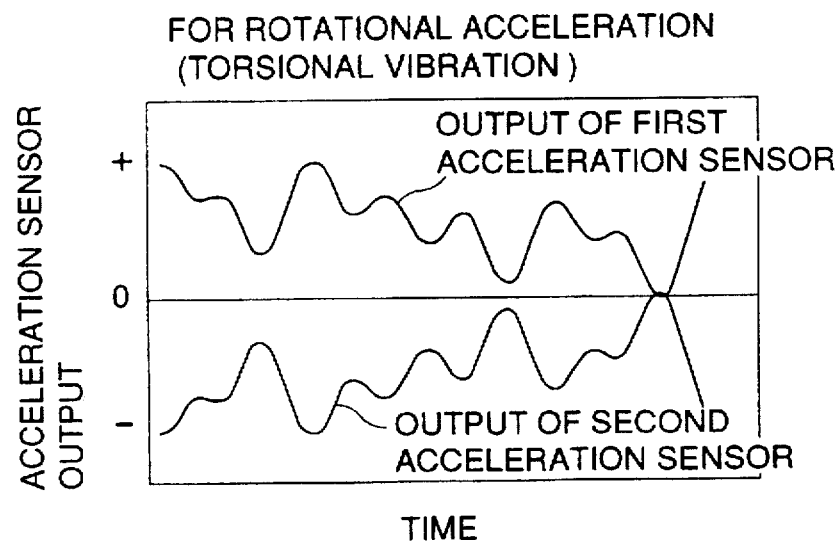
Figure 22:
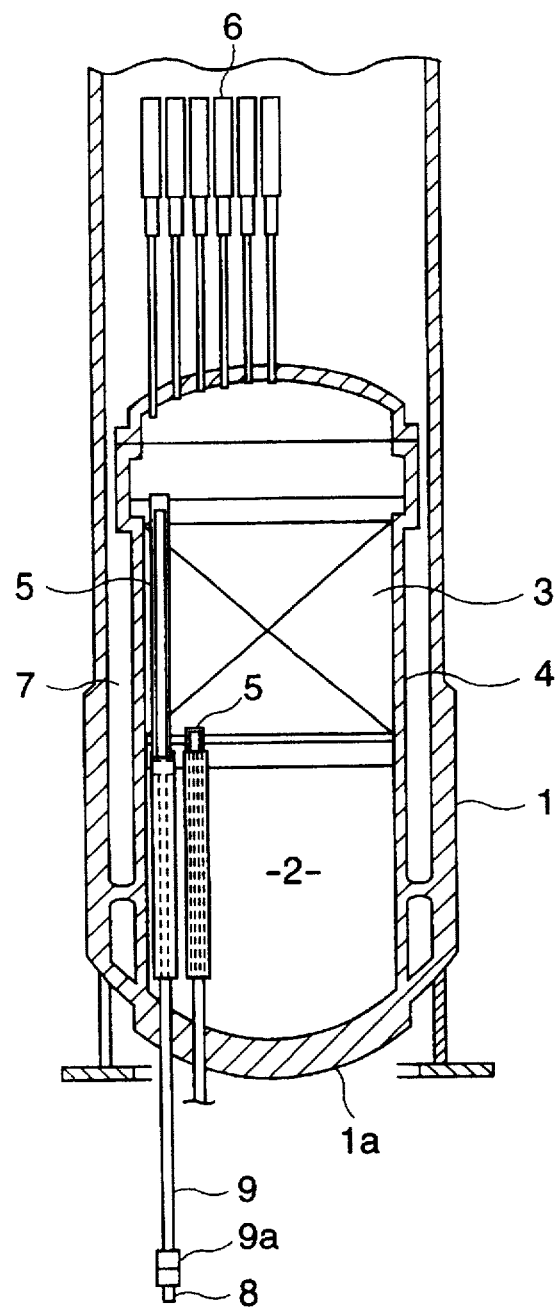
FIG. 22 is a vertical cross-sectional view of a reactor pressure vessel, illustrating the installation state of the control rod drive mechanism.
Figure 23:
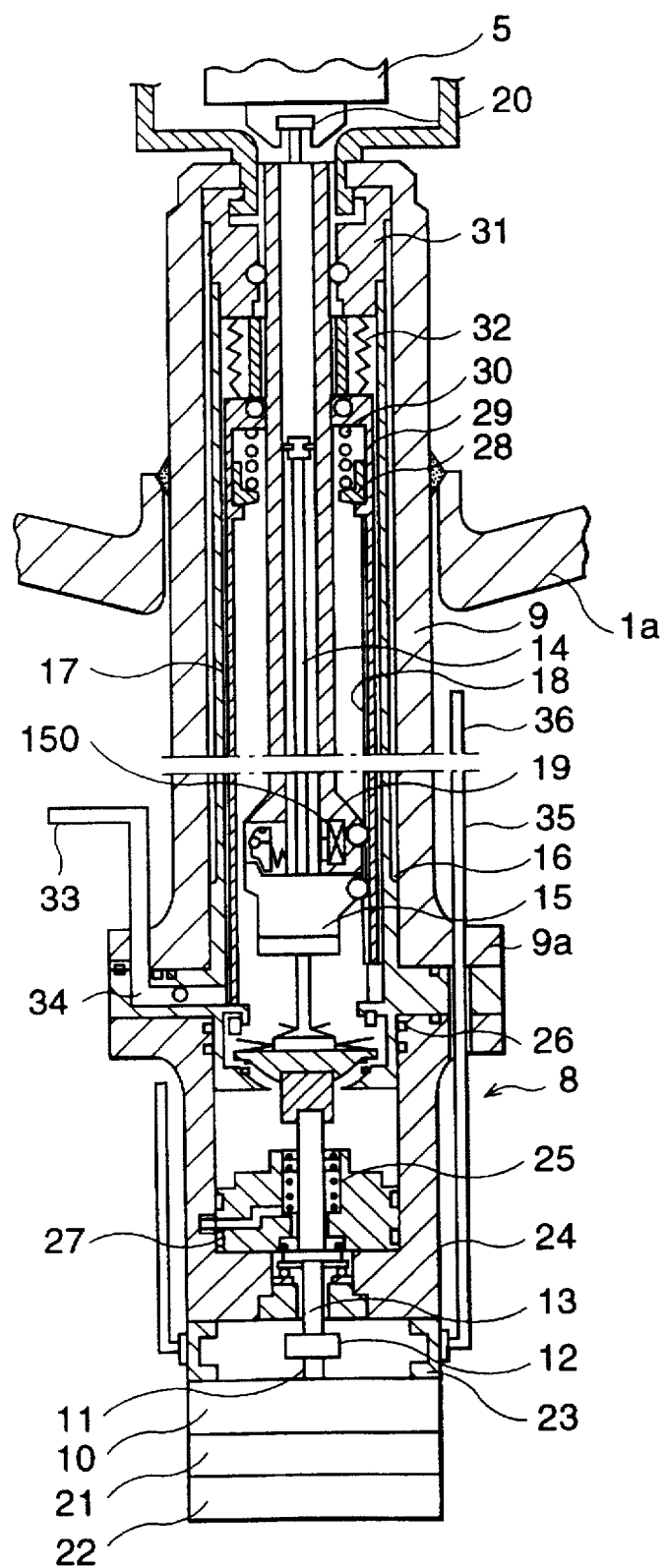
FIG. 23 is a vertical cross-sectional view of a prior-art example of a control rod drive mechanism.

The angular acceleration can be detected more accurately by installing a plurality of acceleration sensors 224. Assume for this example that two acceleration sensors 224 are installed symmetrically with reference to the rotary shaft 215 of the motor, as shown in FIG. 20. If the linear acceleration in a direction y in the figure (the direction parallel to the acceleration detection direction) is used, the outputs obtained during linear acceleration from the acceleration sensors 224 have the same positive or negative side whereas those for rotational acceleration have different positive and negative sides, as shown in FIG. 21. These different curves can be easily differentiated.

As described above, with the control rod drive mechanism of the above described configuration, the invention disclosed in claim 1 of this specification makes it possible to install the outer magnet from above the outer yoke, while allowing it to slide along a magnet installation surface. This makes it easy to assemble the magnet into the yoke and thus shortens the manufacturing time and reduces manufacturing costs. In contrast to the configuration in which the assembly is done from below the outer yoke, the outer yoke and the lower flange thereof can be made an integral structure, thus making it possible to increase the rigidity of the outer yoke and also reduce manufacturing costs because of this simpler structure.

The invention disclosed in claim 2 has the same characteristics as that of claim 1, but can also provide greater flexibility in deciding the dimensions of the bearing.

The invention disclosed in claims 3, 4, 5, and 7 makes it possible to diagnose the reactor without stopping it, to check that there are no abnormalities such as rubbing and deterioration within the elevator mechanism or strain or settling in the fuel or control rod, by determining the magnitude of the load applied to the elevator mechanism of the control rod drive mechanism.

The invention disclosed in claim 6 is capable of performing this diagnosis with ease.

The invention disclosed in claims 8 to 11 makes it possible for the magnets to maintain their integrity with respect to impact loads incurred by the control rod drive mechanism during a scram or from earthquake loads.

The invention disclosed in claims 12 to 14 makes it possible to perform an integrity diagnosis on the magnetic coupling and the control rod drive mechanism while the nuclear reactor is operating, to determine the degree of deterioration in the magnetic forces of the magnets or identify the occurrence of slipping in the magnetic coupling. Since the magnetic sensor can be easily installed and removed, deteriorated or damaged components can be replaced or repaired with ease.

The invention disclosed in claim 15 makes it possible for the magnets to maintain their integrity with respect to impact loads incurred by the control rod drive mechanism during a scram or from earthquake loads, by the use of a sliding bearing, and also enables greater flexibility in deciding the dimensions of the bearing.

The invention disclosed in claims 16 to 19 makes it possible to detect slipping of the magnetic coupling by detecting the rotational position of the first magnet and comparing it with the rotational position of the second magnet, thus further increasing the reliability of the plant.

The invention disclosed in claims 20 to 29 make it possible to detect slipping by detecting the torque that is generated after such slipping occurs, from changes in a parameter such as the phase difference between the current and voltage waveforms, the current, or torsional strain generated in components such as the casing of the electric motor. This makes it possible to further increase the reliability of the plant.

What is claimed is:

1. A control rod drive mechanism for transmitting the rotation of an electric motor via a drive shaft to an elevator apparatus for raising and lowering a hollow piston on an upper end of which is provided a control rod that controls the output of a nuclear reactor, to insert said control rod into a reactor core or remove it therefrom, and also insert said control rod rapidly into said reactor core by the injection of high-pressure water to force said hollow piston upward, wherein said control rod drive mechanism comprises:

a magnetic coupling having an inner magnet, which is divided into a plurality of parts and is disposed at a lower portion of said drive shaft in order to transmit the rotational power of said electric motor to said drive shaft, and a drive-side outer magnet, which is divided into a plurality of parts and is provided on a rotary shaft of said electric motor in an arrangement on an outer side of said inner magnet; and a circular cylindrical outer yoke on an inner surface of which said outer magnet is mounted on, wherein a radial-direction position of an outer magnet installation surface on said outer yoke is the same as a radial-direction position of an inner surface of said outer yoke which is above said outer magnet installation surface, or further inward therefrom, wherein a conductor is disposed between said inner and outer magnets in such a manner that an induction voltage caused by a rotational magnetic field generated by the rotation of said inner and outer magnets is generated in said conductor, and changes in the waveform of said induction voltage that are caused by changes in the torque angle formed between said inner and outer magnets are detected.

2. A control rod drive mechanism as defined in claim 1, further comprising means for measuring changes in the waveform of said induction voltage and thus inferring said torque angle.

3. A control rod drive mechanism as defined in claim 2, wherein said means for inferring said torque angle uses the left-right symmetry of a time-history waveform of a half-period of said induction voltage waveform.

4. A control rod drive mechanism as defined in claim 3, wherein said left-right symmetry of said time-history waveform of a half-period of said induction voltage waveform is evaluated by comparison of voltages in two regions separated by an intermediate time within said half-period.

5. A control rod drive mechanism as defined in claim 2, further comprising means for inferring from said torque angle the magnitude of load applied to said elevator apparatus of said hollow piston.

6. A control rod drive mechanism for transmitting the rotation of an electric motor via a drive shaft to an elevator apparatus for raising and lowering a hollow piston on an upper end of which is provided a control rod that controls the output of a nuclear reactor, to insert said control rod into a reactor core or remove it therefrom, and also insert said control rod rapidly into said reactor core by the injection of high-pressure water to force said hollow piston upward, wherein said control rod drive mechanism comprises:

a magnetic coupling having an inner magnet, which is divided into a plurality of parts and is disposed at a lower portion of said drive shaft in order to transmit the rotational power of said electric motor to said drive shaft, and a drive-side outer magnet, which is divided into a plurality of parts and is provided on a rotary shaft of said electric motor in an arrangement on an outer side of said inner magnet; and a circular cylindrical outer yoke on an inner surface of which said outer magnet is mounted on, wherein a radial-direction position of an outer magnet installation surface on said outer yoke is the same as a radial-direction position of an inner surface of said outer yoke which is above said outer magnet installation surface, or further inward therefrom, wherein a coating is applied to a surface of at least one of said inner and outer magnets.

7. A control rod drive mechanism for transmitting the rotation of an electric motor via a drive shaft to an elevator apparatus for raising and lowering a hollow piston on an upper end of which is provided a control rod that controls the output of a nuclear reactor, to insert said control rod into a reactor core or remove it therefrom, and also insert said control rod rapidly into said reactor core by the injection of high-pressure water to force said hollow piston upward, wherein said control rod drive mechanism comprises:

a magnetic coupling having an inner magnet, which is divided into a plurality of parts and is disposed at a lower portion of said drive shaft in order to transmit the rotational power of said electric motor to said drive shaft, and a drive-side outer magnet, which is divided into a plurality of parts and is provided on a rotary shaft of said electric motor in an arrangement on an outer side of said inner magnet; and a circular cylindrical outer yoke on an inner surface of which said outer magnet is mounted on, wherein a radial-direction position of an outer magnet installation surface on said outer yoke is the same as a radial-direction position of an inner surface of said outer yoke which is above said outer magnet installation surface, or further inward therefrom, wherein a resilient body is provided in at least one location in a space between at least one of said inner and outer magnets and a member that is adjacent thereto in axial, radial, or peripheral direction.

8. A control rod drive mechanism for transmitting the rotation of an electric motor via a drive shaft to an elevator apparatus for raising and lowering a hollow piston on an upper end of which is provided a control rod that controls the output of a nuclear reactor, to insert said control rod into a reactor core or remove it therefrom, and also insert said control rod rapidly into said reactor core by the injection of high-pressure water to force said hollow piston upward, wherein said control rod drive mechanism comprises:

a magnetic coupling having an inner magnet, which is divided into a plurality of parts and is disposed at a lower portion of said drive shaft in order to transmit the rotational power of said electric motor to said drive shaft, and a drive-side outer magnet, which is divided into a plurality of parts and is provided on a rotary shaft of said electric motor in an arrangement on an outer side of said inner magnet; and a circular cylindrical outer yoke on an inner surface of which said outer magnet is mounted on, wherein a radial-direction position of an outer magnet installation surface on said outer yoke is the same as a radial-direction position of an inner surface of said outer yoke which is above said outer magnet installation surface, or further inward therefrom, wherein a resilient body is provided in a space between divided parts of at least one of said inner and outer magnets, which are each divided into a plurality of parts.

9. A control rod drive mechanism for transmitting the rotation of an electric motor via a drive shaft to an elevator apparatus for raising and lowering a hollow piston on an upper end of which is provided a control rod that controls the output of a nuclear reactor, to insert said control rod into a reactor core or remove it therefrom, and also insert said control rod rapidly into said reactor core by the injection of high-pressure water to force said hollow piston upward, wherein said control rod drive mechanism comprises:

a magnetic coupling having an inner magnet, which is divided into a plurality of parts and is disposed at a lower portion of said drive shaft in order to transmit the rotational power of said electric motor to said drive shaft, and a drive-side outer magnet, which is divided into a plurality of parts and is provided on a rotary shaft of said electric motor in an arrangement on an outer side of said inner magnet; and a circular cylindrical outer yoke on an inner surface of which said outer magnet is mounted on, wherein a radial-direction position of an outer magnet installation surface on said outer yoke is the same as a radial-direction position of an inner surface of said outer yoke which is above said outer magnet installation surface, or further inward therefrom, wherein a resilient body is provided in a space between said outer yoke and said outer magnet.

10. A control rod drive mechanism for transmitting the rotation of an electric motor via a drive shaft to an elevator apparatus for raising and lowering a hollow piston on an upper end of which is provided a control rod that controls the output of a nuclear reactor, to insert said control rod into a reactor core or remove it therefrom, and also insert said control rod rapidly into said reactor core by the injection of high-pressure water to force said hollow piston upward, wherein said control rod drive mechanism comprises:

a magnetic coupling having an inner magnet, which is divided into a plurality of parts and is disposed at a lower portion of said drive shaft in order to transmit the rotational power of said electric motor to said drive shaft, and a drive-side outer magnet, which is divided into a plurality of parts and is provided on a rotary shaft of said electric motor in an arrangement on an outer side of said inner magnet; and a circular cylindrical outer yoke on an inner surface of which said outer magnet is mounted on, wherein a radial-direction position of an outer magnet installation surface on said outer yoke is the same as a radial-direction position of an inner surface of said outer yoke which is above said outer magnet installation surface, or further inward therefrom, wherein a magnetic sensor for determining a magnetic field generated from said inner and outer magnets is provided in an outer peripheral portion of a housing accommodating said magnetic coupling.

11. A control rod drive mechanism for transmitting the rotation of an electric motor via a drive shaft to an elevator apparatus for raising and lowering a hollow piston on an upper end of which is provided a control rod that controls the output of a nuclear reactor, to insert said control rod into a reactor core or remove it therefrom, and also insert said control rod rapidly into said reactor core by the injection of high-pressure water to force said hollow piston upward, wherein said control rod drive mechanism comprises:

a magnetic coupling having an inner magnet, which is divided into a plurality of parts and is disposed at a lower portion of said drive shaft in order to transmit the rotational power of said electric motor to said drive shaft, and a drive-side outer magnet, which is divided into a plurality of parts and is provided on a rotary shaft of said electric motor in an arrangement on an outer side of said inner magnet; and a circular cylindrical outer yoke on an inner surface of which said outer magnet is mounted on, wherein a radial-direction position of an outer magnet installation surface on said outer yoke is the same as a radial-direction position of an inner surface of said outer yoke which is above said outer magnet installation surface, or further inward therefrom, wherein a magnetic sensor for determining a magnetic field generated from said inner and outer magnets is provided within a housing accommodating said magnetic coupling.

12. A control rod drive mechanism as defined in claim 11, wherein said magnetic sensor can be installed and removed from the outside of said housing accommodating said magnetic coupling.

13. A control rod drive mechanism for transmitting the rotation of an electric motor via a drive shaft to an elevator apparatus for raising and lowering a hollow piston on an upper end of which is provided a control rod that controls the output of a nuclear reactor, to insert said control rod into a reactor core or remove it therefrom, and also insert said control rod rapidly into said reactor core by the injection of high-pressure water to force said hollow piston upward, wherein said control rod drive mechanism comprises:

a magnetic coupling having an inner magnet, which is divided into a plurality of parts and is disposed at a lower portion of said drive shaft in order to transmit the rotational power of said electric motor to said drive shaft, and a drive-side outer magnet, which is divided into a plurality of parts and is provided on a rotary shaft of said electric motor in an arrangement on an outer side of said inner magnet; and a circular cylindrical outer yoke on an inner surface of which said outer magnet is mounted on, wherein a radial-direction position of an outer magnet installation surface on said outer yoke is the same as a radial-direction position of an inner surface of said outer yoke which is above said outer magnet installation surface, or further inward therefrom, wherein a rotational support of said inner and outer magnets is provided by a sliding bearing.

14. A control rod drive mechanism for controlling the output of a nuclear reactor, wherein said control rod drive mechanism is provided within a housing extending from a lower portion of said nuclear reactor; the rotation of an electric motor is transmitted via a drive shaft to a hollow piston elevator mechanism, to raise or lower said hollow piston; and thus a control rod linked to said hollow piston is inserted into or removed from a core of said reactor; said control rod drive mechanism comprising:

a spool piece provided at a lower end portion of said housing for sealing a primary coolant within said reactor;

an outer yoke provided outside a lower portion of said spool piece and connected to a rotary shaft of said electric motor;

an outer magnet provided on said outer yoke;

an inner yoke provided within said spool piece and attached to said drive shaft, which is connected to said hollow piston elevator mechanism;

an inner magnet provided on said inner yoke; and means for detecting the rotation of said inner magnet.

15. A control rod drive mechanism as defined in claim 14, wherein said rotation detection means comprises a rotary member, which is provided on said drive shaft that rotates together with said inner magnet and which has indentations formed in a side surface thereof, and a deflection detector, which is provided on a rotating horizontal plane facing said rotary member and which measures the distance to said indentations formed in said side surface of said rotary member.

16. A control rod drive mechanism as defined in claim 14, further provided with an output processing means for comparing an output from said rotation detection means of said inner magnet and an output of a retinal position detection means for detecting the shaft rotation of said rotary shaft of said electric motor.

17. A control rod drive mechanism as defined in claim 16, wherein a control rod position detection means for detecting a vertical position resulting from the insertion or removal of said control rod is provided in place of said rotation detection means of said inner magnet.

18. A control rod drive mechanism for controlling the output of a nuclear reactor, wherein said control rod drive mechanism is provided within a housing extending from a lower portion of said nuclear reactor; the rotation of an electric motor is transmitted via a drive shaft to a hollow piston elevator mechanism, to raise or lower said hollow piston; and thus a control rod linked to said hollow piston is inserted into or removed from a core of said reactor; said control rod drive mechanism comprising:

- a spool piece provided at a lower end portion of said housing for sealing a primary coolant within said reactor;
- an outer yoke provided outside a lower portion of said spool piece and connected to a rotary shaft of said electric motor;
- an outer magnet provided on said outer yoke;
- an inner yoke provided within said spool piece and attached to said drive shaft, which is connected to said hollow piston elevator mechanism;
- an inner magnet provided on said inner yoke; and
- means for detecting a phase difference between a current and voltage of said electric motor and thus inferring the torque of said electric motor.

19. A control rod drive mechanism for controlling the output of a nuclear reactor, wherein said control rod drive mechanism is provided within a housing extending from a lower portion of said nuclear reactor; the rotation of an electric motor is transmitted via a drive shaft to a hollow piston elevator mechanism, to raise or lower said hollow piston; and thus a control rod linked to said hollow piston is inserted into or removed from a core of said reactor; said control rod drive mechanism comprising:

- a spool piece provided at a lower end portion of said housing for sealing a primary coolant within said reactor;
- an outer yoke provided outside a lower portion of said spool piece and connected to a rotary shaft of said electric motor;
- an outer magnet provided on said outer yoke;
- an inner yoke provided within said spool piece and attached to said drive shaft, which is connected to said hollow piston elevator mechanism;
- an inner magnet provided on said inner yoke; and
- frequency analysis means for analyzing a current waveform of said electric motor.

20. A control rod drive mechanism as defined in claim 19, wherein frequency analysis means for analyzing a voltage waveform of said electric motor is provided in place of said frequency analysis means for analyzing a current waveform of said electric motor.

21. A control rod drive mechanism for controlling the output of a nuclear reactor, wherein said control rod drive mechanism is provided within a housing extending from a lower portion of said nuclear reactor; the rotation of an electric motor is transmitted via a drive shaft to a hollow piston elevator mechanism, to raise or lower said hollow piston; and thus a control rod linked to said hollow piston is inserted into or removed from a core of said reactor; said control rod drive mechanism comprising:

- a spool piece provided at a lower end portion of said housing for sealing a primary coolant within said reactor;
- an outer yoke provided outside a lower portion of said spool piece and connected to a rotary shaft of said electric motor;
- an outer magnet provided on said outer yoke;
- an inner yoke provided within said spool piece and attached to said drive shaft, which is connected to said hollow piston elevator mechanism;
- an inner magnet provided on said inner yoke; and
- means for detecting the load torque of said electric motor; wherein:
  said electric motor is an induction motor and said means for detecting the load torque of said electric motor detects said load torque from the rotational speed of said electric motor.

22. A control rod drive mechanism for controlling the output of a nuclear reactor, wherein said control rod drive mechanism is provided within a housing extending from a lower portion of said nuclear reactor; the rotation of an electric motor is transmitted via a drive shaft to a hollow piston elevator mechanism, to raise or lower said hollow piston; and thus a control rod linked to said hollow piston is inserted into or removed from a core of said reactor; said control rod drive mechanism comprising:

- a spool piece provided at a lower end portion of said housing for sealing a primary coolant within said reactor;
- an outer yoke provided outside a lower portion of said spool piece and connected to a rotary shaft of said electric motor;
- an outer magnet provided on said outer yoke;
- an inner yoke provided within said spool piece and attached to said drive shaft, which is connected to said hollow piston elevator mechanism;
- an inner magnet provided on said inner yoke; and
- torque detection means for detecting the torque applied to said rotary shaft of said electric motor or said drive shaft that is linked to said electric motor.

23. A control rod mechanism for controlling the output of a nuclear reactor, wherein said control rod drive mechanism is provided within a housing extending from a lower portion of said nuclear reactor, the rotation of an electric motor is transmitted via a drive shaft to a hollow piston elevator mechanism, to raise or lower said hollow piston, and thus a control rod linked to said hollow piston is inserted into or removed from a core of said reactor, said control rod drive mechanism comprising:

- a spool piece provided at a lower end portion of said housing for sealing a primary coolant within said reactor;
- an outer yoke provided outside a lower portion of said spool piece and connected to a rotary shaft of said electric motor;
- an outer magnet provided on said outer yoke;
- an inner yoke provided within said spool piece and attached to said drive shaft, which is connected to said hollow piston elevator mechanism;
- an inner magnet provided on said inner yoke;
- torque detection means for detecting the torque applied to said rotary shaft of said electric motor or said drive shaft that is linked to said electric motor; and slipping detection means for detecting slippage generated between said outer and inner magnets, using said detected torque.

24. A control rod mechanism for controlling the output of a nuclear reactor, wherein said control rod drive mechanism is provided within a housing extending from a lower portion of said nuclear reactor; the rotation of an electric motor is transmitted via a drive shaft to a hollow piston elevator mechanism, to raise or lower said hollow piston; and thus a control rod linked to said hollow piston is inserted into or removed from a core of said reactor, said control rod drive mechanism comprising:

a spool piece provided at a lower end portion of said housing for sealing a primary coolant within said reactor;

an outer yoke provided outside a lower portion of said spool piece and connected to a rotary shaft of said electric motor;

an outer magnet provided on said outer yoke;

an inner yoke provided within said spool piece and attached to said drive shaft, which is connected to said hollow piston elevator mechanism;

an inner magnet provided on said inner yoke; and strain detection means for detecting strain generated in a stator of said electric motor or a member for fixing said stator to a reactor pressure vessel.

25. A control rod drive mechanism for controlling the output of a nuclear reactor, wherein said control rod drive mechanism is provided within a housing extending from a lower portion of said nuclear reactor; the rotation of an electric motor is transmitted via a drive shaft to a hollow piston elevator mechanism, to raise or lower said hollow piston; and thus a control rod linked to said hollow piston is inserted into or removed from a core of said reactor, said control rod drive mechanism comprising:

a spool piece provided at a lower end portion of said housing for sealing a primary coolant within said reactor;

an outer yoke provided outside a lower portion of said spool piece and connected to a rotary shaft of said electric motor;

an outer magnet provided on said outer yoke;

an inner yoke provided within said spool piece and attached to said drive shaft, which is connected to said hollow piston elevator mechanism;

an inner magnet provided on said inner yoke; and strain detection means for detecting strain generated in a brake that restricts the rotation of said rotary shaft or a member for fixing said brake to a reactor pressure vessel.

26. A control rod mechanism for controlling the output of a nuclear reactor, wherein said control rod drive mechanism is provided within a housing extending from a lower portion of said nuclear reactor; the rotation of an electric motor is transmitted via a drive shaft to a hollow piston elevator mechanism, to raise or lower said hollow piston; and thus a control rod linked to said hollow piston is inserted into or removed from a core of said reactor, said control rod drive mechanism comprising:

a spool piece provided at a lower end portion of said housing for sealing a primary coolant within said reactor;

an outer yoke provided outside a lower portion of said spool piece and connected to a rotary shaft of said electric motor;

an outer magnet provided on said outer yoke;

an inner yoke provided within said spool piece and attached to said drive shaft, which is connected to said hollow piston elevator mechanism;

an inner magnet provided on said inner yoke; and acceleration detection means for detecting the rotational acceleration generated in a stator of said electric motor or a member for fixing said stator to a reactor pressure vessel.

27. A control rod drive mechanism for controlling the output of a nuclear reactor, wherein said control rod drive mechanism is provided within a housing extending from a lower portion of said nuclear reactor; the rotation of an electric motor is transmitted via a drive shaft to a hollow piston elevator mechanism, to raise or lower said hollow piston; and thus a control rod linked to said hollow piston is inserted into or removed from a core of said reactor, said control rod drive mechanism comprising:

a spool piece provided at a lower end portion of said housing for sealing a primary coolant within said reactor;

an outer yoke provided outside a lower portion of said spool piece and connected to a rotary shaft of said electric motor;

an outer magnet provided on said outer yoke;

an inner yoke provided within said spool piece and attached to said drive shaft, which is connected to said hollow piston elevator mechanism;

an inner magnet provided on said inner yoke; and acceleration detection means for detecting the rotational acceleration generated in a brake that restricts the rotation of said rotary shaft or a member for fixing said brake to a reactor pressure vessel.

* * * * *